US012632573B2

(12) United States Patent
Kumaresan et al.

(10) Patent No.: US 12,632,573 B2
(45) Date of Patent: *May 19, 2026

(54) METHOD, APPARATUS, AND COMPUTER-READABLE MEDIUM FOR AUTOMATED CONSTRUCTION OF DATA MASKS

(71) Applicant: Informatica LLC, Redwood City, CA (US)

(72) Inventors: Bala Kumaresan, Cupertino, CA (US); Igor Balabine, Menlo Park, CA (US)

(73) Assignee: INFORMATICA LLC, Redwood City, CA (US)

( * ) Notice: Subject to any disclaimer, the term of this patent is extended or adjusted under 35 U.S.C. 154(b) by 673 days.

This patent is subject to a terminal disclaimer.

(21) Appl. No.: 17/184,365

(22) Filed: Feb. 24, 2021

(65) Prior Publication Data

US 2022/0019678 A1    Jan. 20, 2022

Related U.S. Application Data

(63) Continuation of application No. 15/591,661, filed on May 10, 2017, now Pat. No. 10,970,404, which is a continuation-in-part of application No. 15/161,586, filed on May 23, 2016, now Pat. No. 10,164,945.

(51) Int. Cl.
*G06F 21/00* (2013.01)
*G06F 21/60* (2013.01)

(52) U.S. Cl.
CPC ................................. *G06F 21/604* (2013.01)

(58) Field of Classification Search
CPC .... G06F 21/604; G06F 3/0685; G06F 3/0619; G06F 3/065; G06F 21/316; G06F 21/32; G06F 21/33; G06F 21/335
See application file for complete search history.

(56) References Cited

U.S. PATENT DOCUMENTS

| | | | | |
|---|---|---|---|---|
| 2007/0017985 A1* | 1/2007 | Lapstun | .............. | H04L 63/0823 |
| | | | | 235/487 |
| 2011/0113050 A1* | 5/2011 | Youn | ................... | G06F 21/6218 |
| | | | | 707/E17.124 |
| 2015/0278544 A1* | 10/2015 | Movshovitz | .......... | H04L 9/0662 |
| | | | | 713/193 |

* cited by examiner

*Primary Examiner* — Jeffrey C Pwu
*Assistant Examiner* — Helai Salehi
(74) *Attorney, Agent, or Firm* — Reed Smith LLP; Amardeep S. Grewal

(57) ABSTRACT

A system, method and computer-readable medium for generating a data masking syntactic definition for a data element of an unknown data type, including generating one or more alphabets corresponding to one or more element member positions of the data element based at least in part on element members occurring at each element member position in a plurality of data elements of the unknown type, each alphabet comprising a set of one or more sequential element members that have occurred in the plurality of data elements at an element member position and generating a positional map describing a syntactic structure of the data element by mapping at least one of the one or more alphabets to each element member position of the data element.

21 Claims, 26 Drawing Sheets

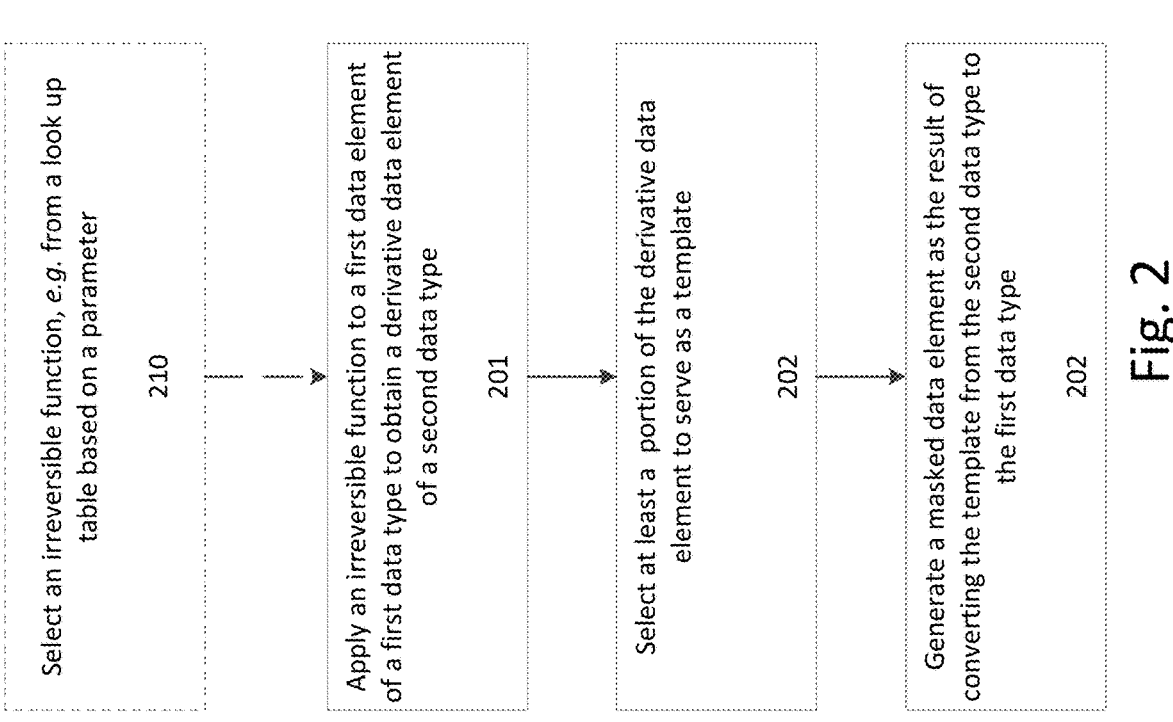

Select an irreversible function, *e.g.* from a look up table based on a parameter

210

Apply an irreversible function to a first data element of a first data type to obtain a derivative data element of a second data type

201

Select at least a portion of the derivative data element to serve as a template

202

Generate a masked data element as the result of converting the template from the second data type to the first data type

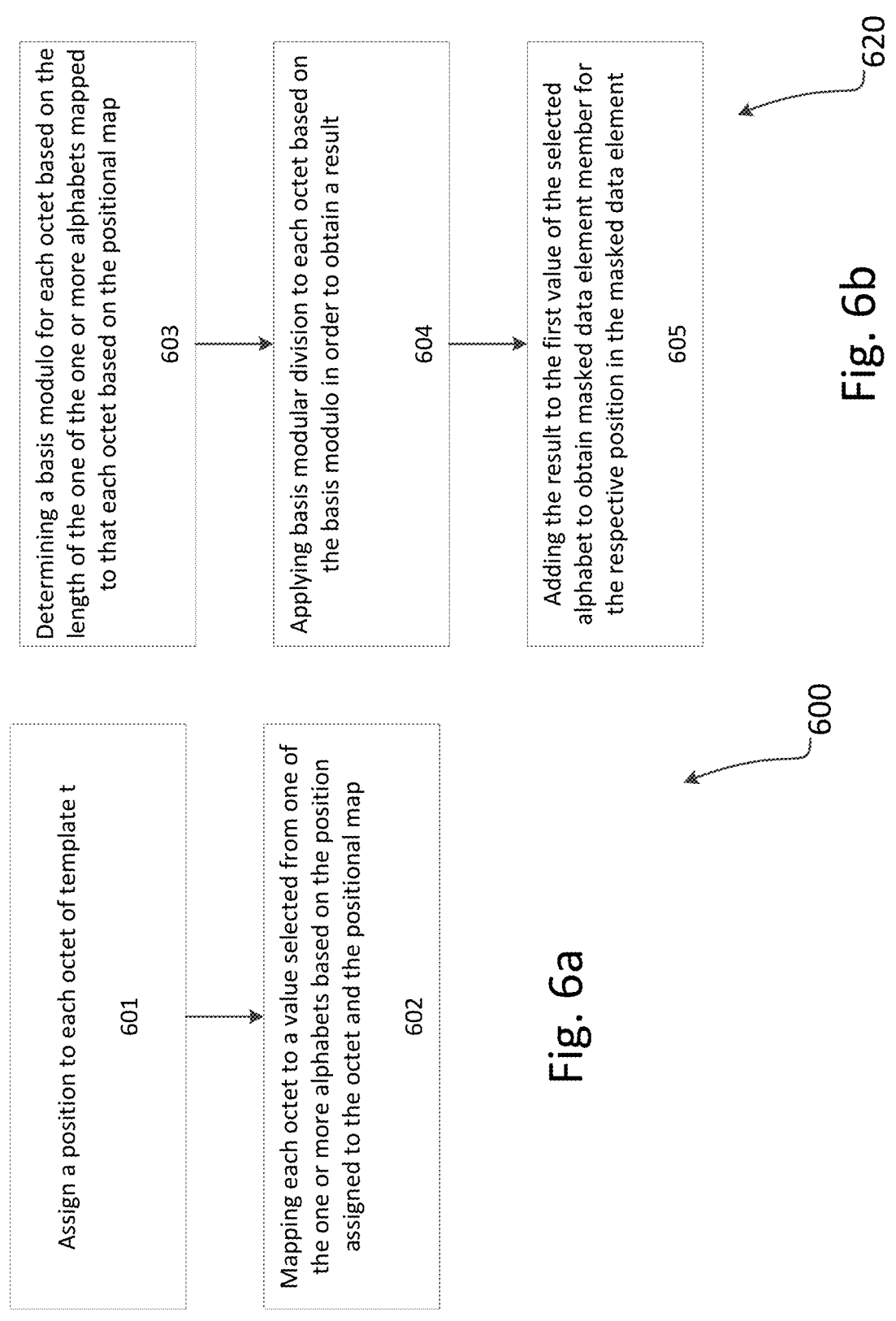

Determining a basis modulo for each octet based on the length of the one of the one or more alphabets mapped to that each octet based on the positional map

603

Applying basis modular division to each octet based on the basis modulo in order to obtain a result

604

Adding the result to the first value of the selected alphabet to obtain masked data element member for the respective position in the masked data element

Assign a position to each octet of template t

601

Mapping each octet to a value selected from one of the one or more alphabets based on the position assigned to the octet and the positional map

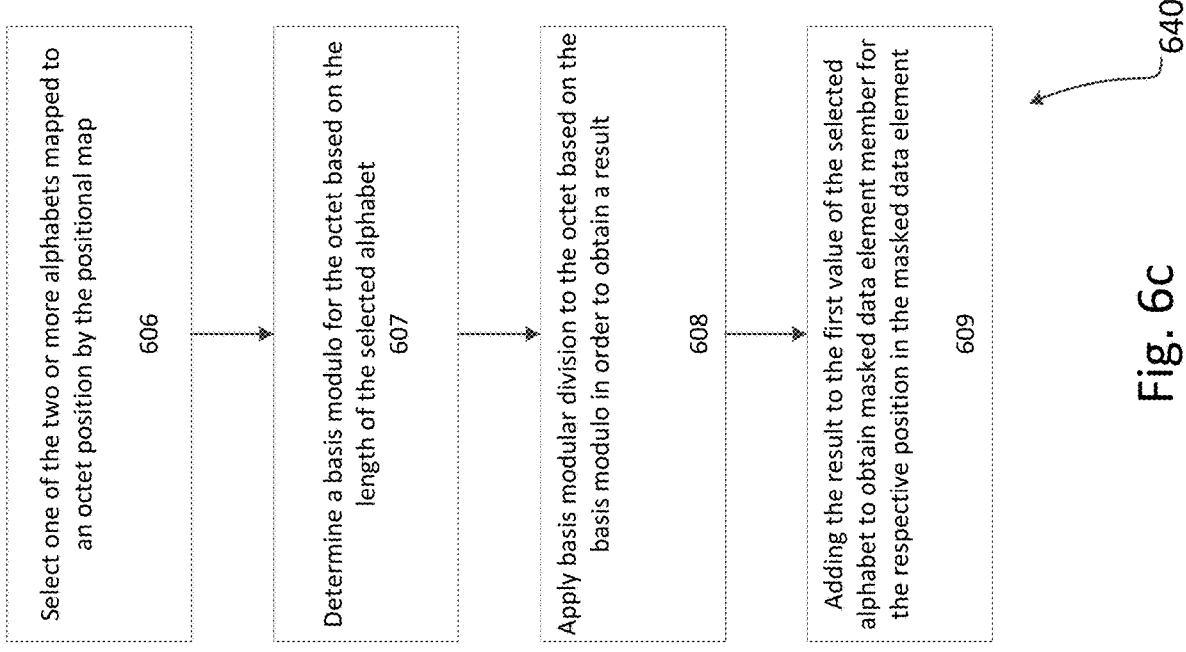

Select one of the two or more alphabets mapped to an octet position by the positional map
606

Determine a basis modulo for the octet based on the length of the selected alphabet
607

Apply basis modular division to the octet based on the basis modulo in order to obtain a result
608

Adding the result to the first value of the selected alphabet to obtain masked data element member for the respective position in the masked data element
609

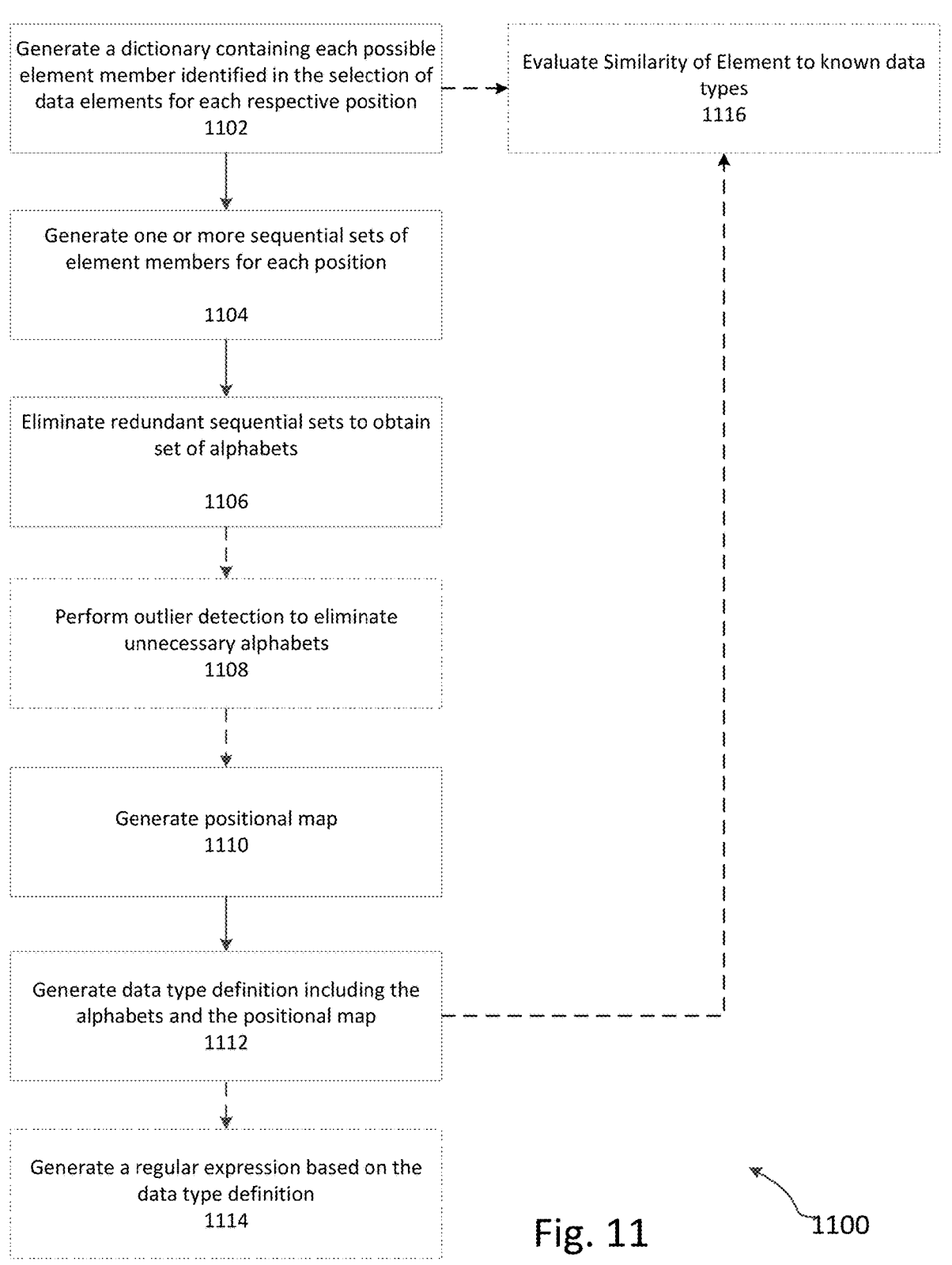

Generate a dictionary containing each possible element member identified in the selection of data elements for each respective position
1102

Evaluate Similarity of Element to known data types
1116

Generate one or more sequential sets of element members for each position

1104

Eliminate redundant sequential sets to obtain set of alphabets

1106

Perform outlier detection to eliminate unnecessary alphabets
1108

Generate positional map
1110

Generate data type definition including the alphabets and the positional map
1112

Generate a regular expression based on the data type definition
1114

Figure 13:
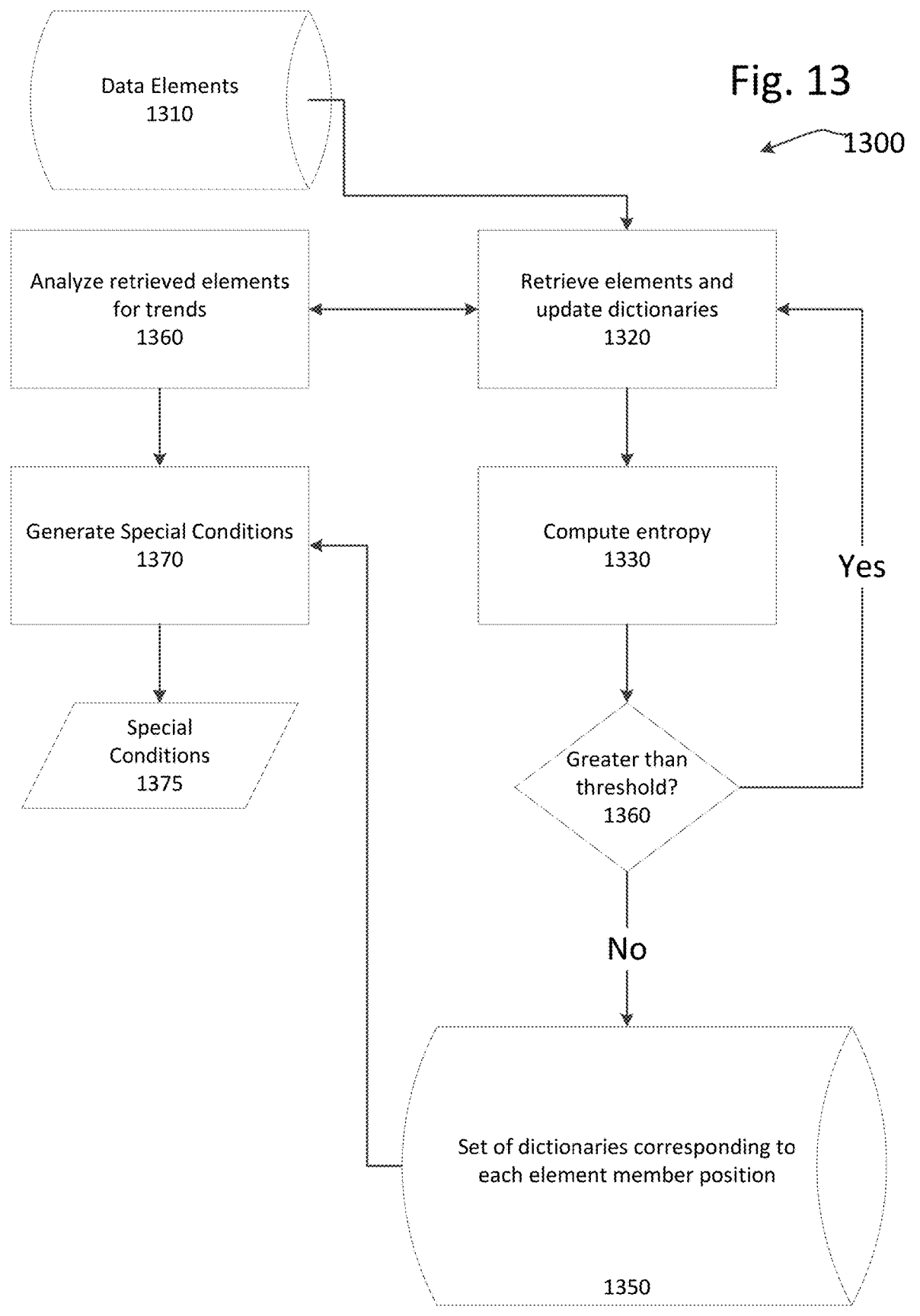

Data Elements
1310

Analyze retrieved elements
for trends
1360

Retrieve elements and
update dictionaries
1320

Generate Special Conditions
1370

Compute entropy
1330

Special
Conditions
1375

Greater than
threshold?
1360

Yes

No

Set of dictionaries corresponding to
each element member position

Figure 14:
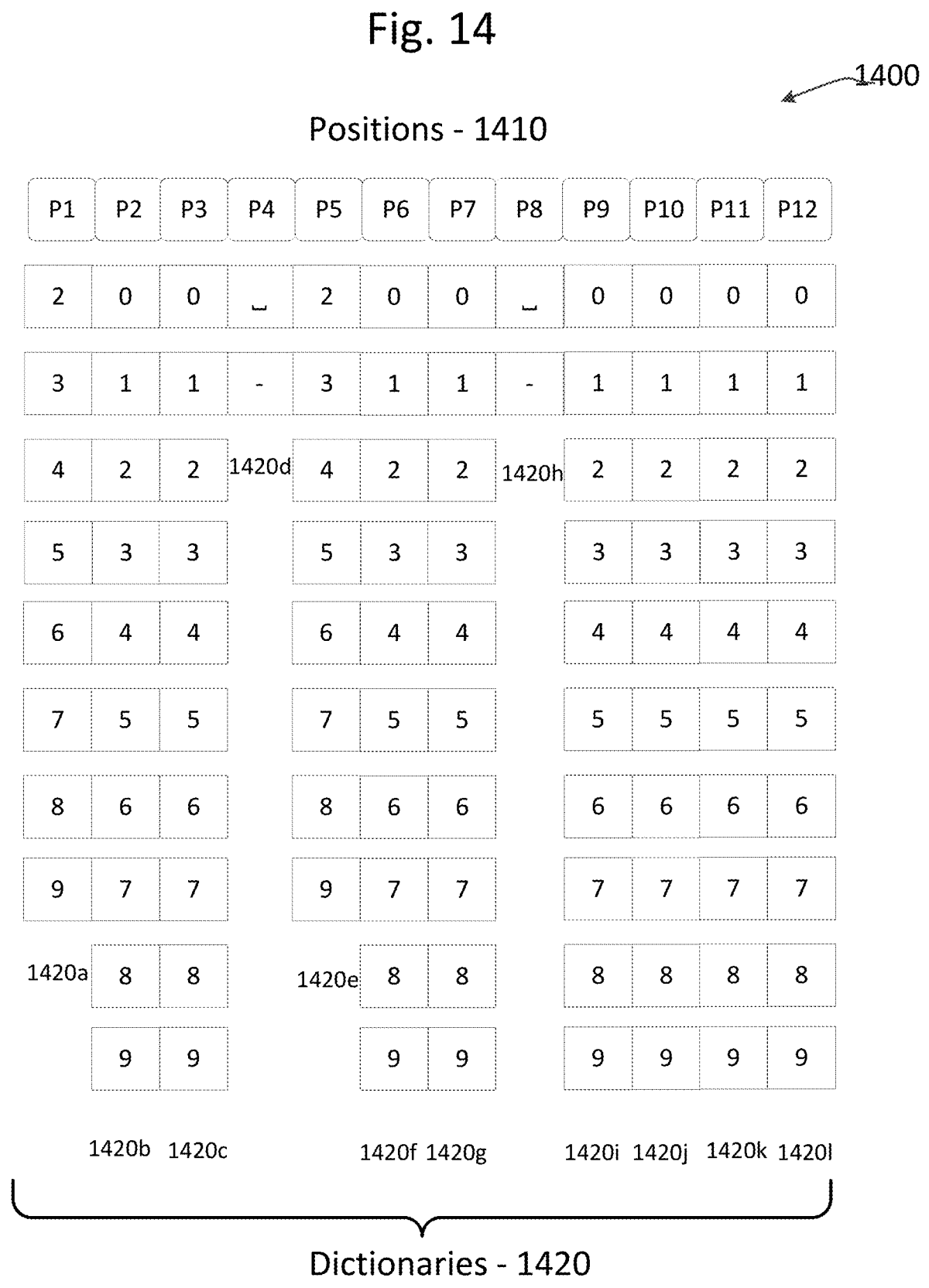

Positions - 1410

| P1 | P2 | P3 | P4 | P5 | P6 | P7 | P8 | P9 | P10 | P11 | P12 |
|----|----|----|----|----|----|----|----|----|-----|-----|-----|
| 2  | 0  | 0  | ␣  | 2  | 0  | 0  | ␣  | 0  | 0   | 0   | 0   |
| 3  | 1  | 1  | -  | 3  | 1  | 1  | -  | 1  | 1   | 1   | 1   |
| 4  | 2  | 2  |    | 4  | 2  | 2  |    | 2  | 2   | 2   | 2   |
| 5  | 3  | 3  |    | 5  | 3  | 3  |    | 3  | 3   | 3   | 3   |
| 6  | 4  | 4  |    | 6  | 4  | 4  |    | 4  | 4   | 4   | 4   |
| 7  | 5  | 5  |    | 7  | 5  | 5  |    | 5  | 5   | 5   | 5   |
| 8  | 6  | 6  |    | 8  | 6  | 6  |    | 6  | 6   | 6   | 6   |
| 9  | 7  | 7  |    | 9  | 7  | 7  |    | 7  | 7   | 7   | 7   |
|    | 8  | 8  |    |    | 8  | 8  |    | 8  | 8   | 8   | 8   |
|    | 9  | 9  |    |    | 9  | 9  |    | 9  | 9   | 9   | 9   |

1420d   1420h 1420a   1420e 1420b   1420c     1420f   1420g     1420i   1420j   1420k   1420l

Dictionaries - 1420

1500

1600

1700

| A₁ | A₂ | A₂ | A₃,A₄ | A₁ | A₂ | A₂ | A₃,A₄ | A₂ | A₂ | A₂ | A₂ |
|----|----|----|-------|----|----|----|-------|----|----|----|----|
| P1 | P2 | P3 | P4 | P5 | P6 | P7 | P8 | P9 | P10 | P11 | P12 |

2100

Sample A
e.g. 787-53-05
2110

Evaluate Similarity
2130

Sample B
e.g. 436 67-52
2120

Degree of
Similarity
2140

2200

All Observed
Alphabets
2210

Outlier detection
2230

Set of
Alphabets
2240

METHOD, APPARATUS, AND COMPUTER-READABLE MEDIUM FOR AUTOMATED CONSTRUCTION OF DATA MASKS

RELATED APPLICATION DATA

This application is a continuation of application Ser. No. 15/591,661, filed May 10, 2017 and titled "METHOD, APPARATUS, AND COMPUTER-READABLE MEDIUM FOR AUTOMATED CONSTRUCTION OF DATA MASKS," which is a continuation-in-part of application Ser. No. 15/161,586, filed May 23, 2016 and titled "METHOD, APPARATUS, AND COMPUTER-READABLE MEDIUM FOR MASKING DATA," the disclosures of which are hereby incorporated by reference in its entirety.

BACKGROUND

Data masking, or redacting, is an important data management technology which prevents access to sensitive data by unauthorized users. Data masking can be applied to stored data at any time, applied when data elements are changed in the persistent data store, or applied to the data while it is in transit wherein data elements are changed while being transmitted to the data consumer.

Data masking techniques include masking data reversibly. Reversible data masking allows recovery of the original data from its masked representation. Data element encryption is an example of a reversible data masking technique. Irreversible data masking, alternatively, transforms the original data element in such way that its original content is wholly or partially lost. For example, one irreversible masking technique extracts a substring of a character string and replaces the remaining characters with arbitrary values.

Traditional data masking is not application friendly. When traditional data masking techniques, such as partial redacting, are applied the applications produce different results than they would with original unmasked data elements. This is especially so when sensitive data is syntactically defined as, for example, a formatted data string such as a driver's license number stored as a data element such as PA12345678, where the first two data element members represent the state of issue and is limited to a set of fifty two-letter state identifiers. In such a case, a masking that results in a data element ZX87654321 received by an application might result in errors during processing if the application expects one of the fifty state identifiers. Or for example, a query on a data set comprising data elements each having the first 12 digits of a credit card number masked (for example xxxx-xxxx-xxxx-1234) can produce different result than a query on an unmasked data set due to possible duplicate credit cards with same last four digits of the account number.

Format preserving encryption technology ("FPE") exhibits certain desirable properties, but has difficulty (or is entirely incapable of) handling data elements having specialized format transform rules, and requires the management of sensitive cryptographic material. For example, a California license plate has a syntactically constructed format such that the first member of the California license plate is a digit between two and seven, the next three members are letters, and the last three members are digits between zero and nine. FPE is incapable of performing a semantically correct transformation of a complex data element such as a California license plate number due to the independence between the data object components. For example, the three letter code cannot be derived from the serial number value and vice versa. Any attempt to adjust the three letter code to achieve semantic correctness of the license plate number leads to the loss of original information during decryption or requires additional information stored in the database which effectively increases the size of the protected data objects in the database.

Accordingly, improvements are needed in systems for masking data while preserving formatting in a deterministic fashion such that each instance of an original data element when transformed by the data masking system under the same conditions results in the same masked data element having the same format.

In order to properly mask a data element, the masking application should be knowledgeable of at least the data elements syntax. One typical way of discovering a data elements syntax is data profiling. Traditional data profiling applications engage in a "metadata plus data" approach, which first attempts to determine the data element data type based on available metadata and then attempts to match the data elements internal structure to a collection of known syntactic patterns each of which is associated with a known semantic category, for example U.S. Social Security numbers, credit card numbers, geographic locations, bank account numbers, routing numbers, phone numbers, etc.

This traditional data element profiling approach suffers when there is uncertainty in the metadata, for example when there is no metadata associated with a data element or a set of data elements. For example, a database column containing ABA routing numbers can not contain any indication of its content in its label, which can be simply "FI"—which might be an acronym for "financial institution." Also, the metadata can simply be misleading, for example where a database column is labeled "SSN," but the data itself can not contain Social Security Numbers, but instead might include hull classifications for nuclear powered submarines such as SSN-774, a Virginia class submarine.

Another typical approach to object profiling relies on regular expressions ("RegExp"), which provide a binary— "match" or "no match"—result when assessing data object types. RegExp-based approaches do not produce any indicative result when the data element syntax is even slightly different from a given template; and, are incapable of providing any hints as to how one might proceed in determining a data element type.

BRIEF DESCRIPTION OF THE DRAWINGS

FIG. 2 illustrates a flowchart for a method for generating a masked data element according to an exemplary embodiment.

FIG. 6a-c illustrate flow charts for methods for generating intermediate data elements for generating a masked data element according to an exemplary embodiment.

FIG. 11 illustrates a flowchart for a method for generating a syntactic definition for use in data masking according to an exemplary embodiment.

FIG. 13 illustrates a functional flow block diagram for generating a set of dictionaries and special conditions of a data element type according to an exemplary embodiment.

FIG. 14 illustrates an exemplary set of dictionaries for each position according to an exemplary embodiment.

DETAILED DESCRIPTION

Figure 1:
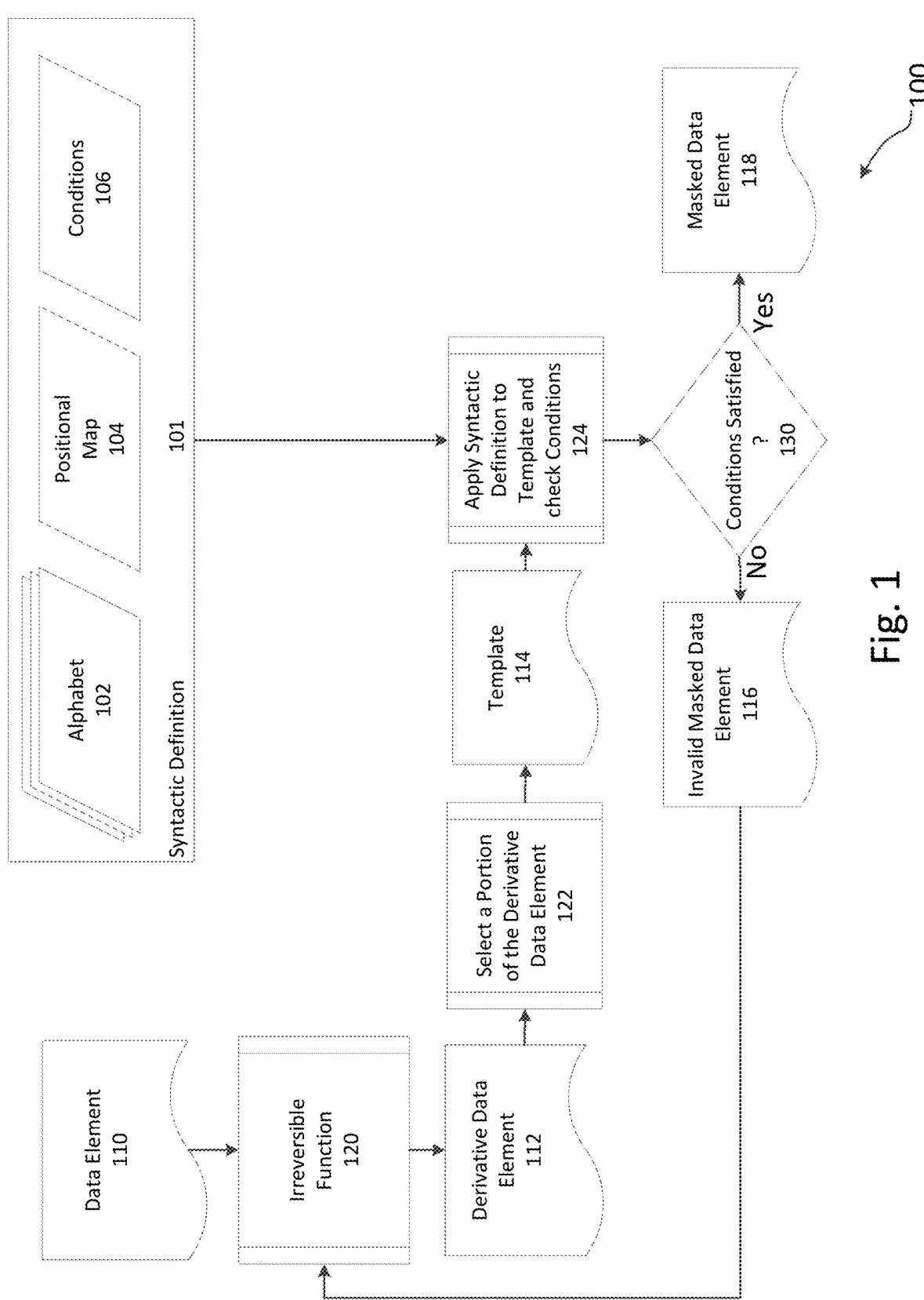
FIG. 1 illustrates a functional flow block diagram for generating a masked data element of an exemplary embodiment.

While methods, apparatuses, and computer-readable media are described herein by way of examples and embodiments, those skilled in the art recognize that methods, apparatuses, and computer-readable media for generating masked data elements utilizing format preserving data masking are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

Due to limitations of the traditional masking, an improved technique for providing a masking mechanism for preserving format of the original data element in order to attain robust results from business applications which operate on masked data is desirable. Applicant has discovered methods, apparatus, and computer-readable media for generating masked data elements from original data elements utilizing format preserving data masking. The disclosed methods, media and systems involve data object characterization by means of one or a plurality of attributes, such as data type, data position, one or more basis sets or alphabets, and security parameters. More specifically, the disclosed methods and systems involve processing sensitive data elements to mask sensitive data in a way that is transparent to a user and maintains the robust performance of applications which rely on the masked sensitive data, resulting in a more secure computing environment without negatively impacting the performance of the computing environment, and/or in a more secure computing environment while improving the performance of the computing environment over traditional masking techniques.

Additionally, the limitations inherent in traditional data profiling techniques lead to inefficient and imprecise data discovery tools which are difficult to extend and use. Furthermore, the inability to accurately determine a data element's type impedes the ability to protect such data elements, for example through masking techniques, creating unnecessary security risks which can be costly. The disclosed methods alleviate problems related to traditional data object profiling mechanism, and thereby enable immediate protection of newly discovered data objects. Specifically, disclosed methods herein introduce automatic discovery of data element type and data element syntactic definitions which can be applied to construct data object format preserving masks of previously unknown data types.

Applicant has discovered a novel approach to transforming data elements based on a syntactic characterization of a set of data elements to allow a computer to process the data elements in a different way. A syntactic characterization of a data object, for example a sensitive data object, is a way of describing the semantic format of a set of data elements of a same type, for example an ordered pair comprising values of a different type arranged in a particular ordering such as the California license plate number described above.

The present system utilizes a novel technology for preserving the format of an original data element, for example data element x, having a datatype X. When a masking procedure is applied to obtain a masked data element, for example masked data element x*, such that x, x*∈X, that is data element x and masked data element x* each are of a set of all elements having a data type X. In other words, the various embodiments disclosed herein provide a one way mapping F(x) of an element x to another element x* wherein x and x* have the same syntactically defined format.

The embodiments are not limited to a particular type of data element or a particular type of data type. A data element can take, without limitation, the form of continuous numbers, discontinuous numbers, strings, or symbols, any of which can also be subject to special conditions. A data element is comprised of a number of data element members in an ordered arrangement or a random arrangement. Each data element or data element member can be represented and stored according to any type of encoding such as hexadecimal, octal, decimal, decimal binary, binary numbers, binary numbers corresponding to ASCII values, combinations of decimal numbers stored as binary and letters numbers and symbols stored as ASCII values, or any combination of the above. It will be appreciated that any type of encoding can be used to represent the values comprising a data element as the data element is stored, as the data element is retrieved, as the data is communicated, as the data is processed and as the data is displayed to user. It will also be appreciated that the encoding of data elements can occur during the course of processing by necessity or by design to achieve efficiency in coding or system efficiency in implementation. It will also be appreciated that the various transformations of data during the course of storing, retrieving, processing, communicating etc. will all be handled by the various embodiments of the data masking system disclosed herein.

The embodiments can operate in a dynamic fashion applying data masking data elements as they are retrieved, communicated, or processed without the need to store intermediate values or masked values after they are needed, because each original data element will always result in the same format preserved masked data element under the same conditions. For example conditions can be the user, the users authorization, the users access level, the access level of the requesting application, the authorization level of the application or the machine one which the application is running, the instance of the data element, the database table in which the data element is stored, the database instance, or the particular deployment of the database. It will be appreciated that the types of conditions that might alter the masking of a data element are many and varied and not limited by those listed herein, but chosen by a system designer based on design specifications and costs including processing costs and costs associated with a data elements value among other things.

It will be further appreciated that the embodiments disclosed herein do not require any encryption schemes and are thus free of any restrictions associated with the use of encryption, while at the same time the masking capabilities provided by the data masking capabilities are equal to or exceed those data masking techniques that rely on encryption techniques, such as FPE, without the necessity of managing sensitive cryptographic information. It will also be appreciated that the data masking disclosed herein has significantly more flexibility than a comparable encryption based solution by virtue of unimpeded application of specialized format preserving transformation rules which are not possible with encryption based approaches.

Though the embodiments described herein are not reliant on encryption they are compatible with encrypted data while being independent of the encryption mechanisms in a particular system. Thus, the data masking mechanism disclosed herein allows separating the process of data objects encryption and format preserving presentation. In an exemplary implementation of this invention data objects in a database are encrypted using standard cryptographic methods such as AES encryption in Galois/Counter Mode (GCM) or, without limitation, in any other standard block cipher application mode while format preserving transformation is performed by a remote proxy service.

Though the description involves examples involving masking of a license plate number to demonstrate how a complex syntactically defined data element can be processed according to one or more embodiments, the disclosed methods, systems, and computer-readable medium can also be utilized to mask sensitive data elements of arbitrary data objects, such as bank account numbers, badge numbers, identification numbers, classification numbers, names, credit cards numbers, and the like.

FIG. 1 illustrates an example of generating a masked data element from an original data element by way of a functional flow block diagram of an exemplary embodiment 100. Here the original data element is data element 110. Data element 110 can be comprised of one or more data element members. For example it can be comprised of seven members, or alternatively sixteen members, or an arbitrarily large or small number of members. Each member can be encoded according to a particular data type and arranged in an ordered manner.

First, an irreversible function 120 is applied to data element 110. The irreversible function is a one way function. The irreversible function 120 can be for example a hash function, a deterministic random bits generator ("DRBG"), or a pseudorandom number generator ("PRNG"). The irreversible function can for example be sha-256 or md5. It will be appreciated that any one way function can be used so long as it deterministically arrives at the same output for a given set of inputs, and the particular form of the irreversible function can be selected based on the security requirements of the system.

Irreversible function 120 when applied to data element 110 outputs a derivative data element 112. Depending on which one way function is chosen as the irreversible transform 120, the resulting derivative data element will comprise a fixed number of values encoded in a uniform format that typically will not be of the same data type as data element 110, that is the derivative data element 112 will not be syntactically defined in the same way as data element 110. Derivative data element 112 can, if for example the irreversible transform is md5, comprise for example thirty-two hexadecimal members encoded in binary digits, two hexadecimal digits to an octal, or alternatively it can be encoded as a string of thirty-two members each encoded in ASCII. Alternatively, for example, if the irreversible function 120 is adler32, the derivative data element 112 can be a string of eight values.

If a longer derivative data element 112 is desired, for example when using md5 as the irreversible function 120 resulting in a derivative data element comprising thirty-two member members but a given data element x is of data type X, having elements that comprise fifty data element members, the length in element members of the derivative data element can be increased for example by applying md5 to x and then hashing the result and concatenating the two values. For example the resulting derivative data value can be md5(x)∥md5(md5(x)). This process can be reiterated to obtain a derivative data value of at least any desired size.

A template 114 is selected 122 from a portion of the derivative data element 112. This selection of template 114 can be accomplished in any suitable manner. For example for a data element x 110 of length ten, i.e. L(x)=10, the selection of template 114 can be accomplished by selecting the first ten derivative data element members of the derivative data element 112 counting from the left. Alternatively the selection of template 114 can be accomplished by selecting the first ten derivative data element members from the right. Alternatively, the selection of template 114 can be accomplished by selecting the twenty-sixth through thirty-fifth derivative data element members from either the left or right. It will be appreciated that any suitable deterministic algorithm can be used to select a template 114 from derivative data element 112.

A masked data element 118 is then obtained by applying 124 a syntactic definition 101 to template 114. Syntactic definition 101 characterizes all elements of data type X in terms of one or more alphabets 102, a positional map 104, and a set of conditions 106. For example, a California license plate issued after 1982, as discussed above, for example x=4SAM123 is syntactically defined by the format mSSSnnn, where m is taken from the alphabet of digits between 2 and 9, SSS is sequence of three characters taken from English alphabet, i.e. set of letters A-Z, and nnn is a three digit sequence of digits from 0 to 9. A special condition for California passenger vehicle license plate number is a gap in the character sequence: license plates 3YAA-3ZYZ series were not issued. Though simplified for brevity the above example thoroughly illustrates characterization of a data object type at hand.

In the case of the California license plate data element x, for example 110, having syntactic compound of the form mSSSnnn is of data type X, such that data element members $x_n$ for $0 \leq n \leq 6$ are ordered in the form $x_6 x_5 x_4 x_3 x_2 x_1 x_0$ where all elements of data type X comprise members of the form $x_6 \in m$, $x_5 \ x_4 \ x_3 \in SSS$, and $x_2 \ x_1 \ x_0 \in nnn$, where any $x_n$ comprises one octet for $0 \leq n \leq 6$, for example $x_6 \in m$, comprises one octect of type m, it follows that SSS comprises three octets of type S, and nnn comprises three octets of type n; and for example, each octet is either an ASCII character or an 8 bit described binary number, such that x is a total of 7 octets. Each data element x of data type X comprises member data elements each of which is characterized by one of the following alphabets: $x_5$, $x_4$, $x_3 \in S \in A_1 = \{ABCD \ldots XYZ\}$; $x_2$, $x_1$, $x_0 \in n \in A_2 = \{0123456789\}$; $x_6 \in m \in A_3 = \{234567\}$. Thus the syntactic compound data element x, for example 110, expressed as data element members $x_6 x_5 x_4 x_3 x_2 x_1 x_0$ of form mSSSnnn, is associated with a positional map that maps each data element member to an alphabet 102 for example positional map 104: $x_6 x_5 x_4 x_3 x_2 x_1 x_0 \in A_3 \ A_2 \ A_2 \ A_2 \ A_1 \ A_1 \ A_1$. The syntactic compound word x of data type X, for example data element 110, additionally is associated with a set of conditions 106 (these special conditions allow for the discontinuities in the data element x), for example conditions 106 are: for $x_6=3 \in A_3$, the following condition applies: $x_5 x_4 x_3 < YAA$ or $x_5 x_4 x_3 > ZYZ$.

Applying 124 syntactic definition 101 to template 114 generates a masked data element 118 by converting the template to data type X by any suitable method. When one or more conditions 106 must be satisfied for masked data element 118 to conform to the syntactic definition, the conditions are then checked, at step 130, to determine that the conditions are satisfied. If the conditions are not satisfied, the result is an invalid masked data element 116. Irreversible function 120 is then applied to the invalid masked data element 116 and the system again carries out the method described above, and this is repeated until the conditions are satisfied, thus generating masked data element 118.

FIG. 2 illustrates a flowchart 200 for a method for generating a masked data element from a first data object, which can for example be a sensitive data object requested from a database by an application. At step 201, an irreversible function is applied to a first data element of a first data type which irreversibly transforms the first data element into a second data element of a second data type. The first data element is of a first data type. The irreversible function is any one way function which outputs a result from which it is impossible to obtain the original first data element, or for which it is impractically difficult to obtain the original data element. Examples of various irreversible transforms applied at step 201 are a DRBG, a PRNG, and various hash functions, some non-limiting examples being: Adler32, CRC32, Haval, MD2, MD4, MD5, RipemD128, RipemD160, SHA-1, SHA-256, SHA-384, SHA-512, Tiger, and Whirlpool. Additionally, it is appreciated that the irreversible function applied at step 201 can constitute a combination of one or more irreversible functions. It will also be appreciated that the irreversible transform of step 201 can include first augmenting the first data element by applying a unique salt value and subsequently generating a pseudorandom number with the augmented first data element as input seed, or applying a hash function to the augmented first data element, or any combination of these techniques.

Figure 3:
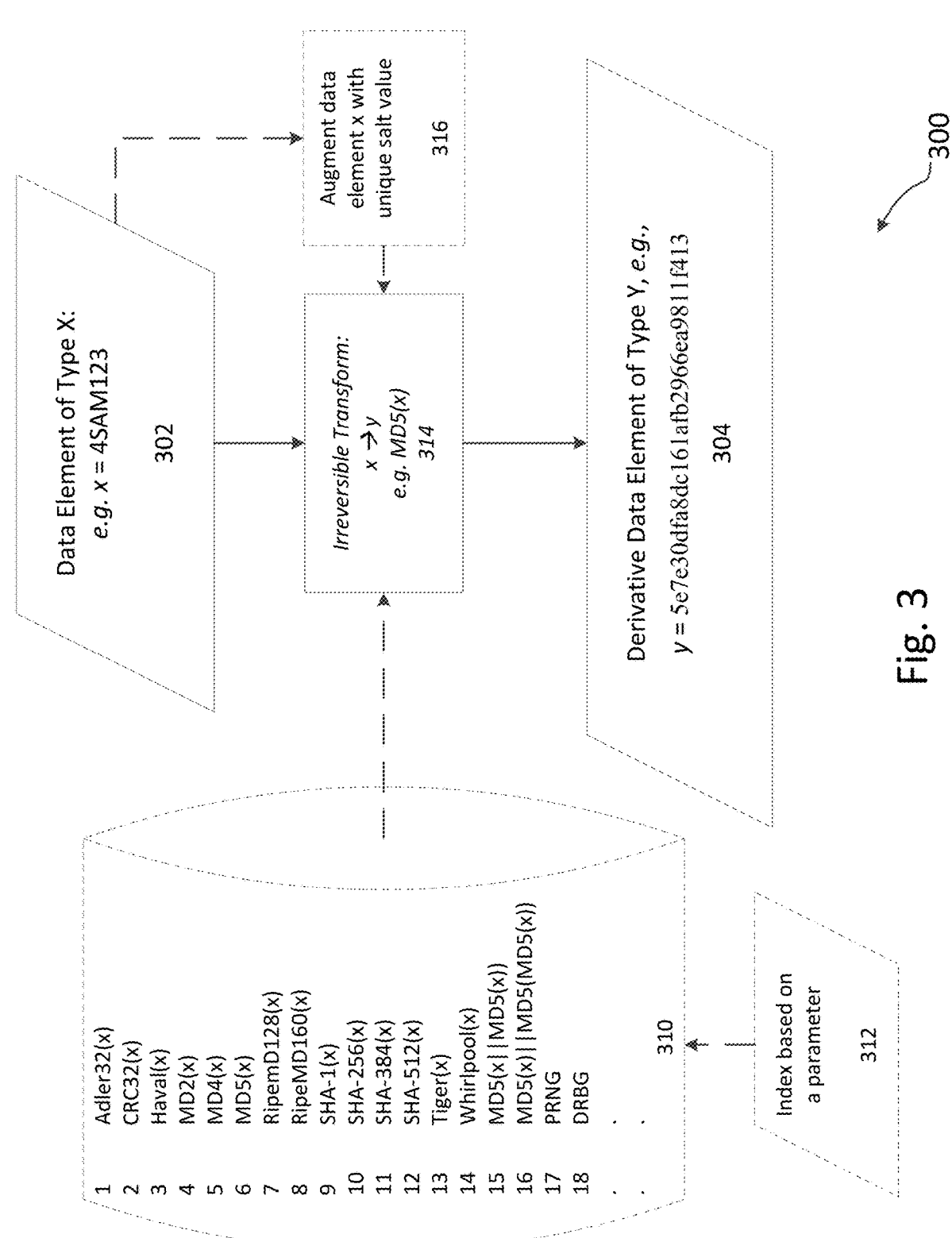
FIG. 3 illustrates a functional flow block diagram for applying an irreversible transform according to an exemplary embodiment.

FIG. 3 illustrates an example of a system's process 300 of applying an irreversible transform 314 to original data element such as data element of type X 302. For exemplary purposes, data element of type X 302 is x=4SAM123, which is of the type California license plate number issued after 1982 (i.e. in this non-limiting example type X denotes of the type California license plate number issued after 1982). For the purposes of illustration, this non-limiting example will be used throughout to demonstrate how an exemplary embodiment generates masked data elements. In the example illustrated in FIG. 3, data element x 302 of type X is transformed 314 to obtain derivative data element y 304 of type Y by applying 314 the hash function md5 to data element x, for example for x=4SAM123, md5(x) =5e7e30dfa8dc161afb2966ea9811f413 is the derivative data element 304 *y*.

Referring back to FIG. 2, optionally a step 210 the irreversible transform, or irreversible function, or one way function, can be selected from a lookup table based on one or more parameters. As illustrated in FIG. 3, the transform applied 314 can optionally be selected from a lookup-table 310 containing a listing of various irreversible transforms. This selection from lookup-table 310 can for example be based on one or more parameters 312, where these parameters can for example be associated with conditions such as the user, the user's authorization, the user's access level, the access level of the requesting application, the authorization level of the application or the machine one which the application is running, the instance of the data element, the database table in which the data element is stored, the database instance, or the particular deployment of the database. Alternatively, the irreversible function, or irreversible transform, 314 can be an iterative function, first applying one transform, and then identifying a portion of the transform, for example the first 10 bits, to obtain an index 312 for selecting a second transform from 310. It will be appreciated that the types of conditions that might alter the selection of an irreversible transform 310 in order apply an irreversible transform 314 to an original data element, for example 302, are many and varied and not limited by those listed herein, but chosen by a system designer based on design specifications and costs including processing costs and costs associated with a data elements value among other things.

Optionally, before applying the irreversible transform 314, data element of Type X 302 can be augmented by applying a unique salt value 316. This unique salt value can for non-limiting example be specific to a particular data object instance, a database table, a database, or a particular deployment among other things. For example, it can be the case that for security reasons a designer can want to preclude an unauthorized user or application from "seeing" that the same data entry, for example "John Smith," exists in two separate databases. For example database A can be managed by a first company, and database B might be managed by a second company, and each of database A and database B might have the entry John Smith. It can be desirable that users or applications of each database should be precluded from knowing that each database A and B has a similar entry. Applying a unique salt 316 to the data element 302 before applying the irreversible transform 314 will ensure that derivative data element 304 of each implementation, or deployment, or instance, will be different.

Figure 4A:
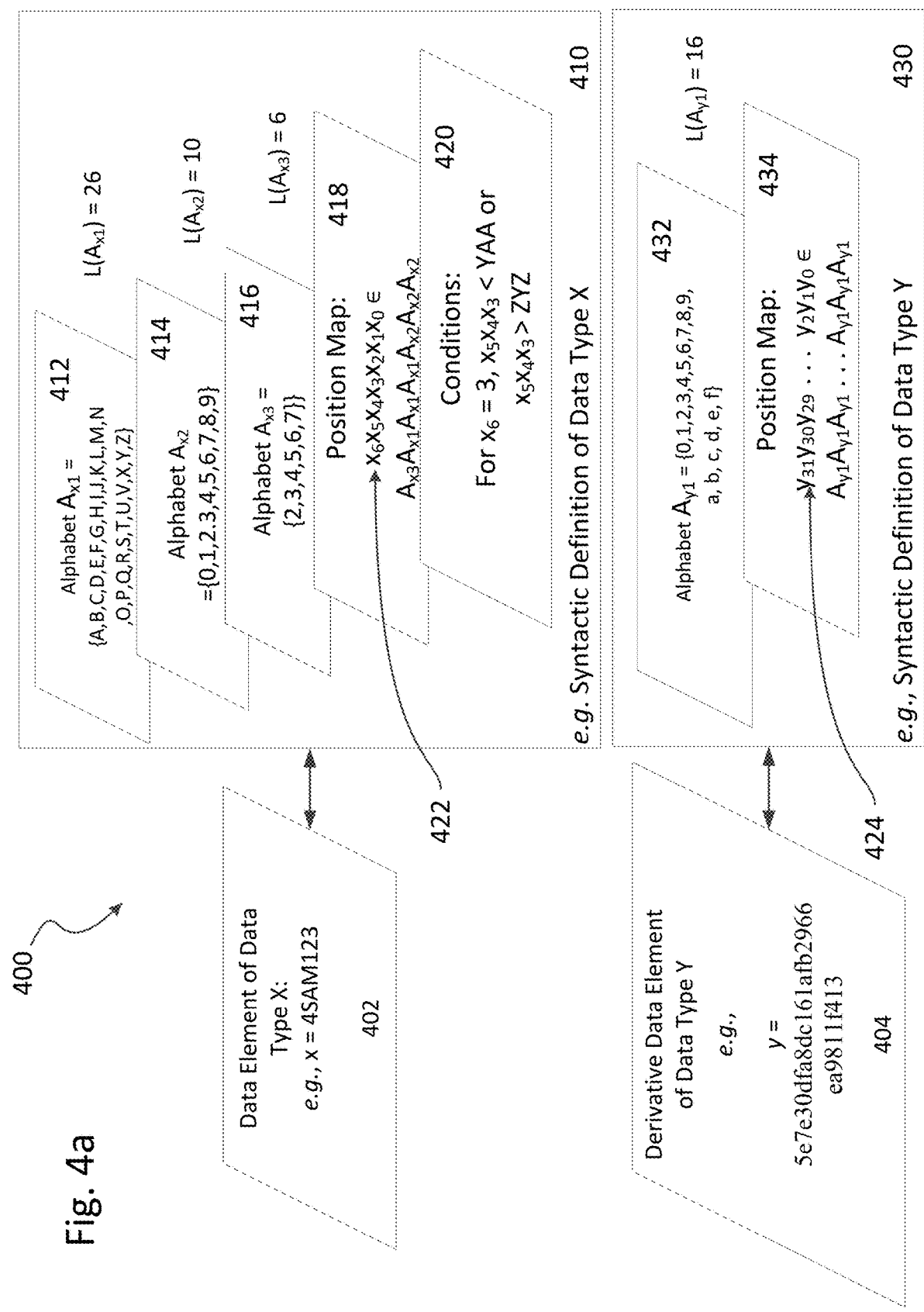
FIG. 4a-b illustrate characterizing data elements according as syntactically defined data types according to an exemplary embodiment.

FIG. 4*a* illustrates exemplary data structures 400 for characterizing an exemplary data element of type X 402 according to an exemplary syntactic definition of data type X 410 and for characterizing a second exemplary data element of type Y 404 according to a second exemplary syntactic definition of data type Y 430. The exemplary syntactic definition of data type X 410 describes the data type of a California license plate issued after 1982. This example is chosen for its illustrative purposes, and demonstrates the robust ability for the disclosed embodiments to describe data types. Data type X 410 is characterized by three alphabets $A_{x1}$ 412, $A_{x2}$ 414 and $A_{x3}$ 416; and, a positional map 418; and a set of conditions 420. Alphabet $A_{x1}$ 412 is an alphabet comprising the set of values of the English alphabet corresponding to capital letters, for example $A_{x1}=\{A, B, C, D, E, F, G, H, I, J, K, L, M, N, O, P, Q, R, S, T, U, V, W, X, Y, Z\}$. $A_{x1}$ 412 has a length, $L(A_{x1})$ computed as the number of values in the set such that $L(A_{x1})=26$. Alphabet $A_{x2}$ 414 comprises the set of all base ten digits, for example $A_{x2}=\{0, 1, 2, 3, 4, 5, 6, 7, 8, 9\}$ and $L(A_{x2})=10$. Alphabet $A_{x3}$ 416 is an alphabet comprising a subset of base ten digits, for example $A_{x3}=\{2, 3, 4, 5, 6, 7\}$ and $L(A_{x3})=6$.

Positional map 418 characterizes all elements of data type X in terms of both the number of data element members of a data element, for example x 402, of data type X, and positional map 418 characterizes all elements of data type X by specifying which alphabet, for example $A_{x1}$ 412, $A_{x2}$ 414, or $A_{x3}$ 416, each data element member, for example data element member $x_6$ 422, is characterized by. Thus, data element x 402 comprises data element members $x_6x_5x_4x_3x_2x_1x_0$, including seven distinct members where each value $x_n$ is a data element member, such as data element member $x_6$ 422, and the resulting data element x 402 is characterized by ordering each data element member $x_n$ according to the positional map, thus to illustrate for x=4SAM123: $x_6=4\in A_{x3}$, $x_5=S\in A_{x1}$, $x_4=A\in A_{x1}$, $x_3=M\in A_{x1}$, $x_2=1\in A_{x2}$, $x_1=2\in A_{x2}$, $x_0=3\in A_{x2}$, as is clearly set forth in positional map 418.

Syntactic definition of data type X 410 includes a set of conditions 420. In this illustrative example, the disclosed embodiment data structure 400 includes conditions 420 in order to reflect the fact that California license plate numbers issued after 1982 exclude unissued license plates beginning with the following range of data element members 3YAA-3ZYZ, because California never issued a series of license plates beginning with the values 3YAA-3ZYZ. Thus one or more conditions 420 are required of a data element, for example 402, in order to accurately describe a data element in the set of all California license plates issued since 1982, for example data type X. One way of describing this condition is to express it as for a data element 402 having a data element member $x_6=3\in A_{x3}$, the data element members $x_5x_4x_3$ a must be less than the value $YAA\in A_{x1}A_{x1}A_{x1}$, or $x_5x_4x_3$ must be greater than the value $ZYZ\in A_{x1}A_{x1}A_{x1}$. It will be appreciated that conditions can be described and imposed in any suitable manner. For example, one or more conditions 420 can be a checksum, or any other discontinuous range of values in an otherwise continuous set, or any condition that generally cannot be expressed in terms of a data element member position and corresponding alphabet.

FIG. 4*a* additionally characterizes derivative data elements, for example 404, of data type Y by the syntactic definition of data type Y 430. As can be seen, data type Y is a simpler characterization as defined by syntactic definition of data type Y 430. Definition 430 characterizes all elements of data type Y, for example y 404, in terms of one alphabet 432 and a positional map, which maps each data element member of data type Y to the single alphabet $A_{y1}$. Thus each of the thirty-two data element members, for example one of which is $y_{31}$ 424, of a data element of data type Y, for example y=5e7e30dfa8dc161afb2966ea9811f413 is mapped to alphabet $A_{y1}$ 432, having a length $L(A_{y1})=16$. In this example alphabet $A_{y1}$ 432 is the set of all hexadecimal numbers 0-f, but it will be appreciated based on these illustrative examples that derivative data elements, for example 404, of data type Y can be characterized by any number of alphabets and a corresponding position based on the irreversible transform applied and the encoding of the result.

Figure 5:
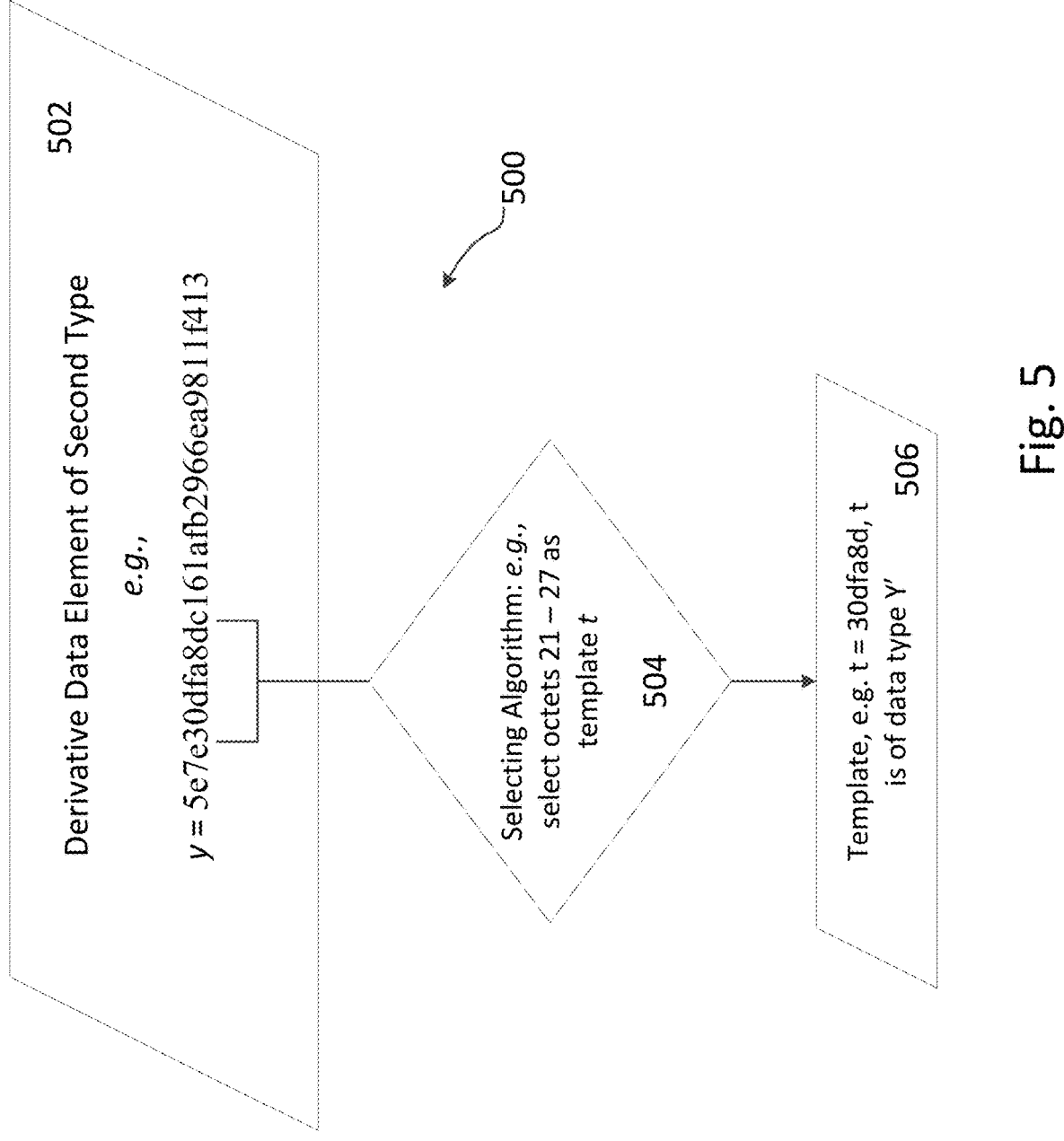
FIG. 5 illustrates a functional flow block diagram for selecting a template from a derivative data element according to an exemplary embodiment.

Referring back to FIG. 2, at step 202, a template is selected to serve as the masking template. This template, for example 506, is selected from a portion of the derivative data element, for example 502, according to various embodiments as is exemplified in the system flow diagram 500 illustrated in FIG. 5. In FIG. 5 it is illustrated by way of example that a selection is made 504 which selects a subset of data element members of derivative data element 502. This selection is made according to an algorithm, for example select octets 21-27 (counting from the right starting with zero as will be appreciated) from derivative data element 502 to generate template t 506, where t is of data type Y' which is characterized by a subset of the positional map describing data type Y, for example a subset of positional map 434 illustrated in FIG. 4*a* corresponding to data element members $y_{27}y_{26}y_{25}y_{24}y_{23}y_{22}y_{21}\in A_{y1}$. It will thus be appreciated that the positional map of data type Y' corresponds to $y_{27}y_{26}y_{25}y_{24}y_{23}y_{22}y_{21}\in A_{y1}$. The length of the selected portion in terms of the number of data element members selected corresponds to the length of data element members of all elements of data type X. In this illustrative example seven data element members are selected as seven octets from derivative data element 502, for example from y to generate template 506, for example t=30dfa8d, where in each data element member is an octet of binary digits expressing the data element member value for example as binary representing ASCII encoded text. This selection 504 of a portion of derivative data element 502 can alternatively be made according to any suitable algorithm. For example, it can be selected according to the algorithm: select the first seven octets counting from the left. In another suitable algorithm the selection can be made according to: select the first three elements from the left and the first four elements from the right and concatenate the two selections to form a template comprising seven data element members. It will be appreciated that the encoding of the selected data members can be any encoding, and the algorithm can differently select data element members as binary encoding hexadecimal numbers, or decimal numbers. The encoding of derivative data element y can be any suitable encoding chosen by the system designer for design reasons, thus it is left to the designer to choose how the selected portion is selected 504 and what encoding is applied to the selected data element members based on system requirements and design considerations. In the following example various encodings are discussed for ease of illustration, but it will be appreciated that these are for illustrative purposes in order to clearly show how an original data element, for example 402, is masked by generating a masked data element.

Figure 4B:
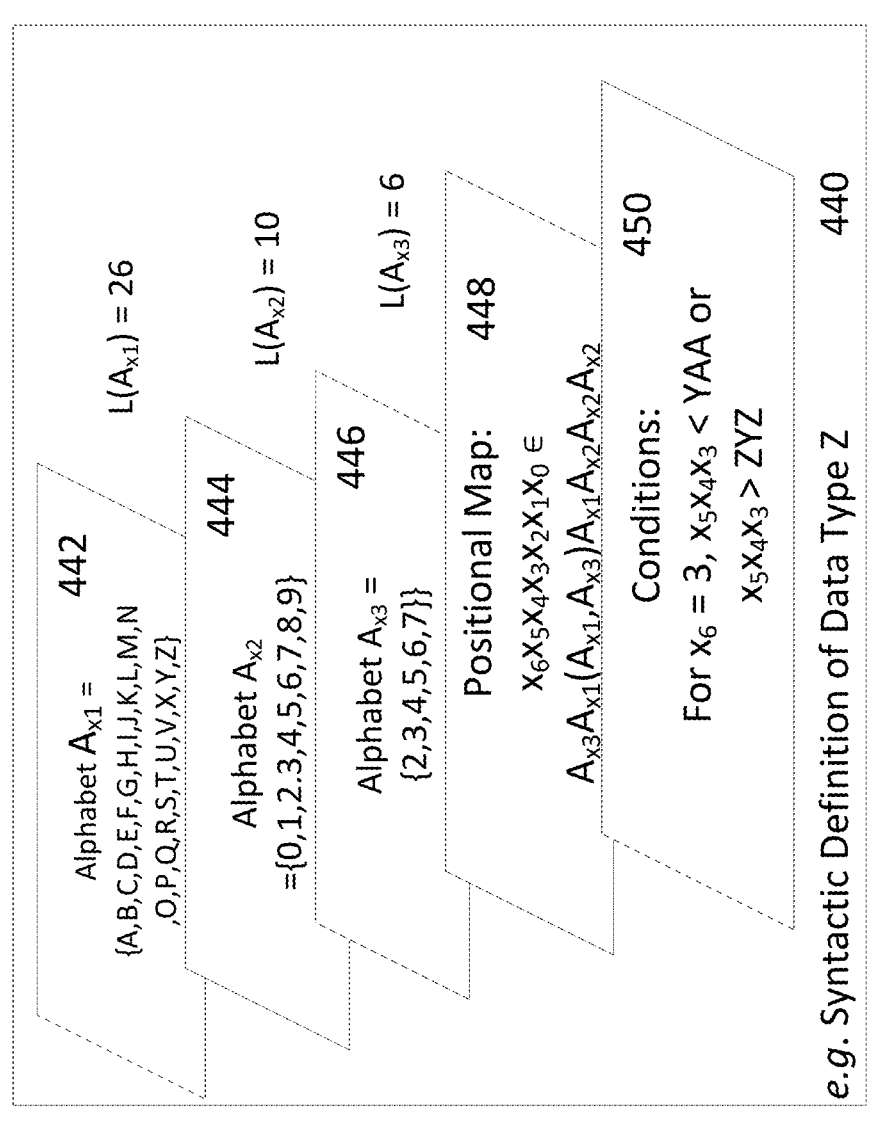

FIG. 4b illustrates an alternative syntactic definition of a data type Z 440. Definition 440 contains a positional map 448 that maps a data element member position $x_4$ to multiple alphabets, here alphabets ($A_{x1}$, $A_{x3}$). For example, when a data element member can include symbols that are not sequential it can be necessary to define a data element member by two or more alphabets, because according to disclosed embodiments alphabets are sets of sequential values. For example the ASCII values of the set of digital numbers 2-7 are represented by sequential hex values 0x32-0x37, and thus my comprise an alphabet; differently, ASCII values for a space " ␣ " represented by the hex value 0x20, and a dash "-" represented by the hex value 0x3D are not sequential, and therefore a dictionary of symbols that can describe a member position that contains either a dash "-" or a space " ␣ " (i.e. the set {- ␣ }) can only be described by two alphabets: {-} and { ␣ }.

Referring back to FIG. 2, at step 202 an embodiment will generate a masked data element by converting the template from the second data type, for example data type Y', to the first data type, data type X. This data transformation of, for example, template 506 of data type Y', generates a set of ordered data element members that is of data type X based on the values of the individual data element members of template 506. FIG. 6a and FIG. 6b illustrate a flow charts which describe the process of generating a masked data element by converting a template, for example t, from one data type to another. It will be appreciated that these flow charts explicitly show steps which can be simply assumed in the designing or coding process. For example a value 12345 is assumed to have the order shown from left to right; but for illustrative purposes to clearly and particularly demonstrate how the template is converted from one data type to another, various steps are shown for clarity purposes. First, at step 601, a position is assigned to each data element member of template t. Then, at step 602, each element member of template t, characterized by an octet for example, is mapped to a value selected from one of the one or more alphabets based on the positional map which describes data elements of the desired data type. This mapping is further described in steps 603, 604, and 605.

Figure 7A:
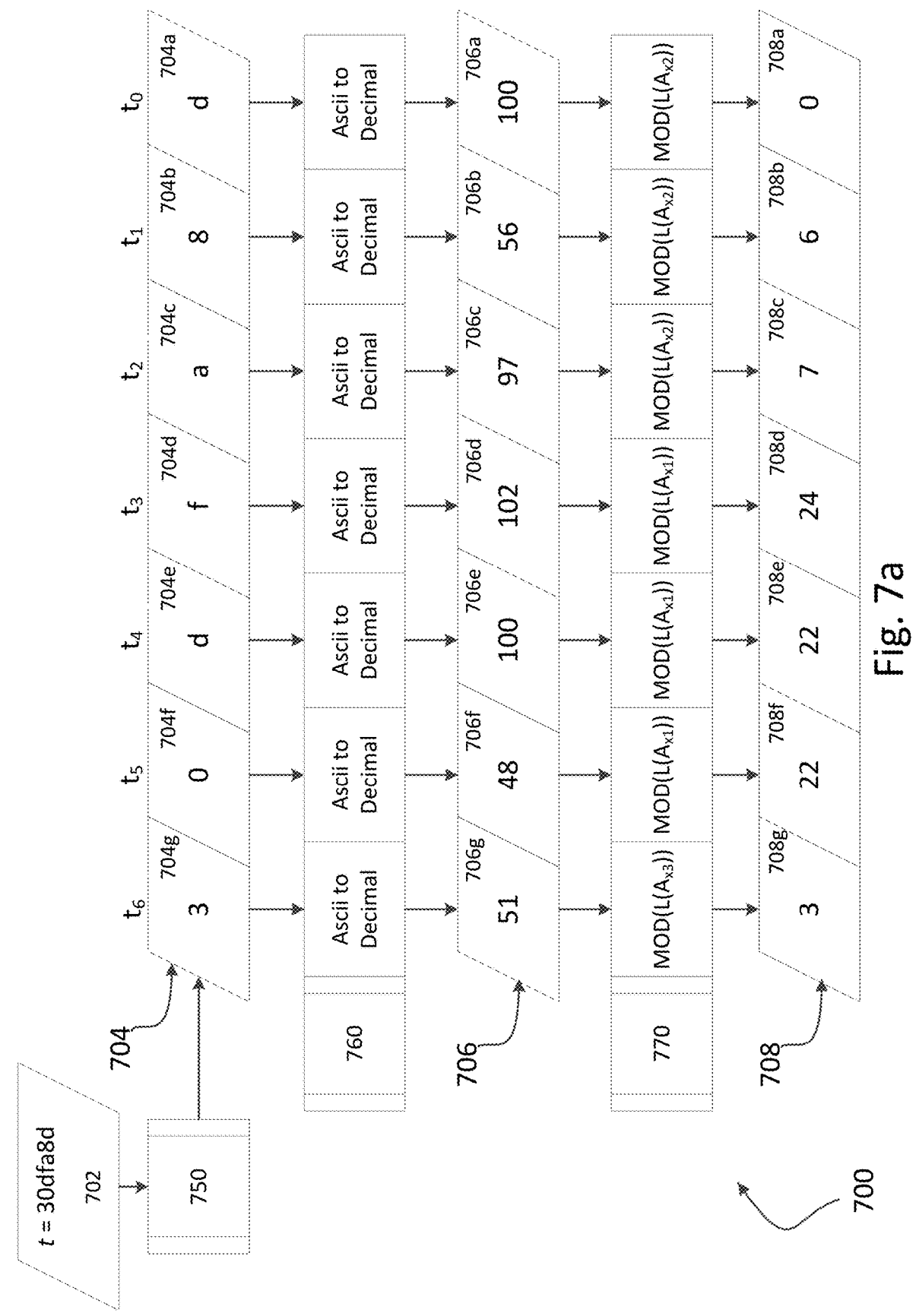
FIG. 7a-b illustrate a functional flow block diagram for generating intermediate data elements from a template for generating a masked data element according to an exemplary embodiment.

Referring to FIG. 7a, which illustrates various intermediate steps in the conversion process attendant to generating a masked data element from a template, for example template 702 corresponding to t=30dfa8d. At subprocess 750, each data element member is assigned to a position 704a-705g, which corresponds to data element members $t_0$-$t_6$. For illustrative purposes, the illustrated example assumes that the data element members $t_0$-$t_6$ assigned to positions 704a-704g are coded in ASCII format. For illustrative purposes, these values can then be operated upon by utilizing the decimal values, or any other basis, of the binary octets underlying the ASCII values, for example, an ASCII '3' corresponds to binary octet '00110011' which corresponds to hexadecimal value '33' which corresponds to octal value '63,' which corresponds to decimal value '51'. In the illustrative example shown in FIG. 7a for ease of demonstration, the values are converted to their corresponding decimal values.

Thus at subprocess 760 the ASCII values are logically converted to their decimal values for performing operations on the values. Thus the representation of data element 704 comprising data element members 704a-704g corresponding to template 702, t=30dfa8d is logically represented at 706 as data element members 706a-706g in logical decimal as '51' '48' '100' '102' '97' '56' '100'. These values need to be mapped to a value within the desired alphabet, for example, 102, 412, 414, or 416, as described by the positional map, for example (102 or 418), of the desired data type (corresponding to the data type of the original data element, for example 110, 302, 402, and 702). In this exemplary embodiment, to accomplish this mapping, modulo division is applied to each of the values 706a-706g where the basis modulo is determined by the length of the alphabet, for example 102, 412, 414, or 416, corresponding to the desired data element member as described by the relevant positional map, for example 102 or 418.

Referring back to FIG. 6b, the step 602 is elaborated upon in chart 620, steps 603-605. First, a basis modulo is determined for each octet of template based on the length of the alphabet corresponding to each data element member, or octet's, position as described in the relevant positional map, for example 102, 412, 414, or 416. Then at step 604 basis modulo division is applied to each octet based on the basis modulo determined for each octet in order to obtain an intermediate result. And then at step 605 the intermediate result is added to the value of the first element of the respective alphabet to obtain a masked data element member for the respective position in the masked data element. Thus, as illustrated by way of example in FIGS. 7a, 7b and FIG. 8, at subprocess 770, for 706g, modulo division is applied to decimal value '51' using modulo basis=L($A_{x3}$)=6 providing result 708g=3, and, for 706f modulo division is applied to decimal value '48' using modulo basis=L($A_{x1}$)=26 providing result 708f=22. For 706e, modulo division is applied to decimal value '100' using modulo basis=L($A_{x1}$)=26 providing the result 708e=22. For 706d, modulo division is applied to decimal value '102' using modulo basis=L($A_{x1}$)=26 providing result 708d=24. For 706c, modulo division is applied to decimal value '97' using modulo basis=L($A_{x2}$)=10 providing result 708c=7. For 706b, modulo division is applied to decimal value '56' using modulo basis=L($A_{x2}$)=10 providing result 708b=6. Finally for 706a modulo division is applied to decimal value '100' using modulo basis=L($A_{x2}$) =10 providing result 708a=0. This process provides the intermediate result data element 708, 708g=3, 708f=20, 708e=22, 708d=24, 708c=7, 708b=6, 708a=0.

Referring to FIG. 6c illustrates a flow charts which describe the process of generating a masked data element by converting a template, for example t, from one data type to another using a syntactic definition, for example syntactic definition 440, containing a positional map that maps two or more alphabets to a single position. In step 606, first one of the two or more alphabets mapped to the position by the positional map (for example positional map 448, which maps alphabets ($A_{x1}$, $A_{x3}$) to position $x_4$) are selected and mapped to the particular octet. Then a basis modulo is determined for the particular octet (to which multiple alphabets are mapped by the positional map) of the template based on the length of the selected alphabet for that position as described in the positional map, for example 448. Then in step 608, basis modulo division is applied to each octet based on the basis modulo determined for each octet in order to obtain an intermediate result. And then at step 609 the intermediate result is added to the value of the first element of the respective alphabet to obtain a masked data element member for the respective position in the masked data element. This process is illustrated in FIG. 7b.

Figure 7B:
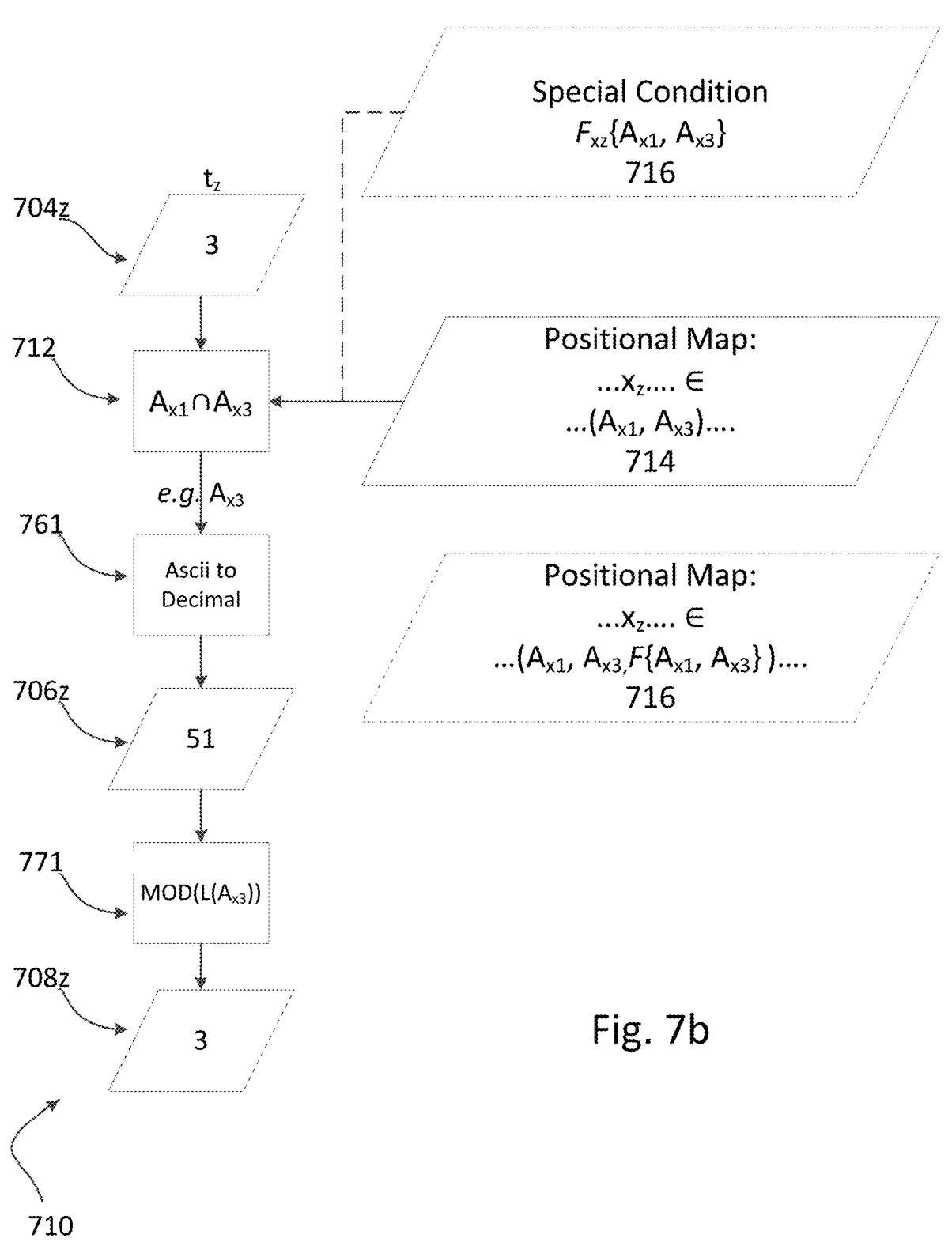

FIG. 7b. which illustrates intermediate steps in the conversion process attendant to generating a masked data element from a template, for example template 702 corresponding to t=30dfa8d in an alternate embodiment in which a positional map, for example positional map 448 or 714, of a syntactic definition, for example definition 440, maps multiple alphabets to a single position. In the example shown here alphabets $A_{x1}$ and $A_{x3}$ are mapped to position $x_z$ by positional map 714. When the system processes template position $t_z$, here by way of example containing value 704$z$ of "3", first one of the two or more alphabets is selected 712. This selection can be a random selection for example of either $A_{x1}$ or $A_{x3}$, but it will be appreciated that the decision as to which alphabet to select can be based on any suitable function for making a decision. It will be appreciated that each alphabet can be weighted, for example by a predetermined probability function that accounts for how often values from the multiple alphabets appear in real data elements. For example, it can be that a positional map also includes a weighting function, for example $F\{Ax1, Ax3\}$, in the mapping, as in exemplary positional map 716, which maps alphabets $A_{x1}$ or $A_{x3}$ to position $x_z$ and includes a weighting function. It will also be appreciated that alternatively the weighting function can be considered a special condition that is imposed by the system for example special condition 718.

Figure 8:
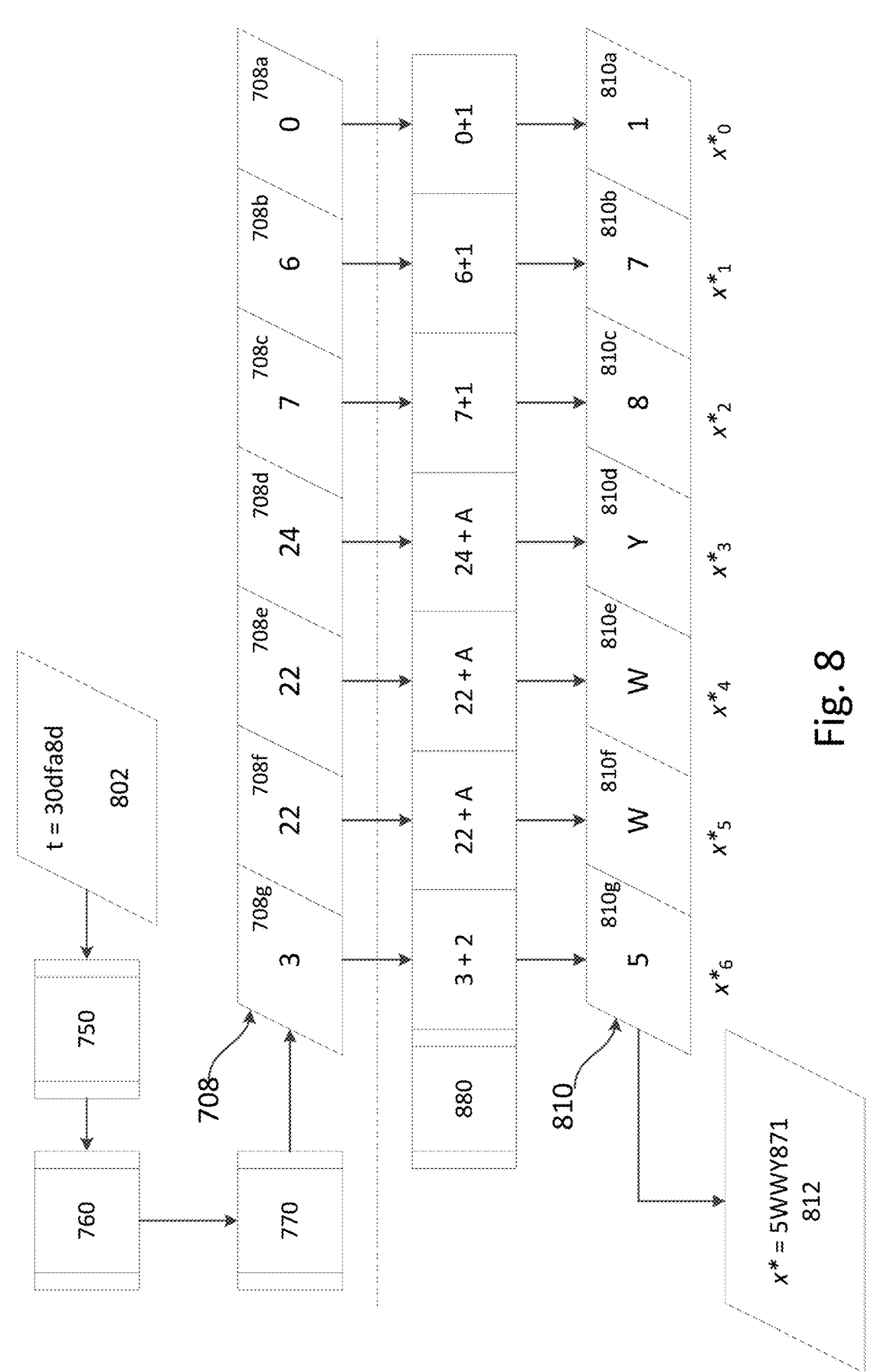
FIG. 8 illustrates a functional flow block diagram for generating a masked data element from a template according to an exemplary embodiment.

From intermediate result data element 708, at subprocess 880, each intermediate data element member 708a-708g is added to the first value of the corresponding alphabet as determined by the positional map for the desired data type of the desired masked data element, for example 812. Recall that all data elements of data type X in this exemplary illustration are described by syntactic definition of data type X 410, including positional map 418, which maps each element of data type X, for example masked data element x* 812, to a respective alphabet 412, 414, or 416. Thus the data element members of x* 812 are $x^*_6 x^*_5 x^*_4 x^*_3 x^*_2 x^*_1 x^*_0$ which correspond to positions 810a-810g in FIG. 8, are mapped to alphabets such that $x^*_6 x^*_5 x^*_4 x^*_3 x^*_2 x^*_1 x^*_0 \in A_{x3} A_{x1} A_{x1} A_{x1} A_{x2} A_{x2} A_{x2}$. Therefore, subprocess 880 adds intermediate data element member 808g, with a value of 3, to the value of the first element of alphabet $A_{x3}$, and so on for intermediate data element members 808f-808a. This gives resulting masked data element members 810g='5', 810f='W', 810e='W', 810d='Y', 810c='8', 810b='7', 810a='1', and a final masked data element 812 x*=5WWY871. This value holds in light of the applicable illustrative conditions 420 as $x^*_6$ is not equal to 3, and so referring to the functional flow block diagram in FIG. 1 the decision at 130 is satisfied and masked data element 812 is the system output, for example corresponding to 118.

Figure 9:
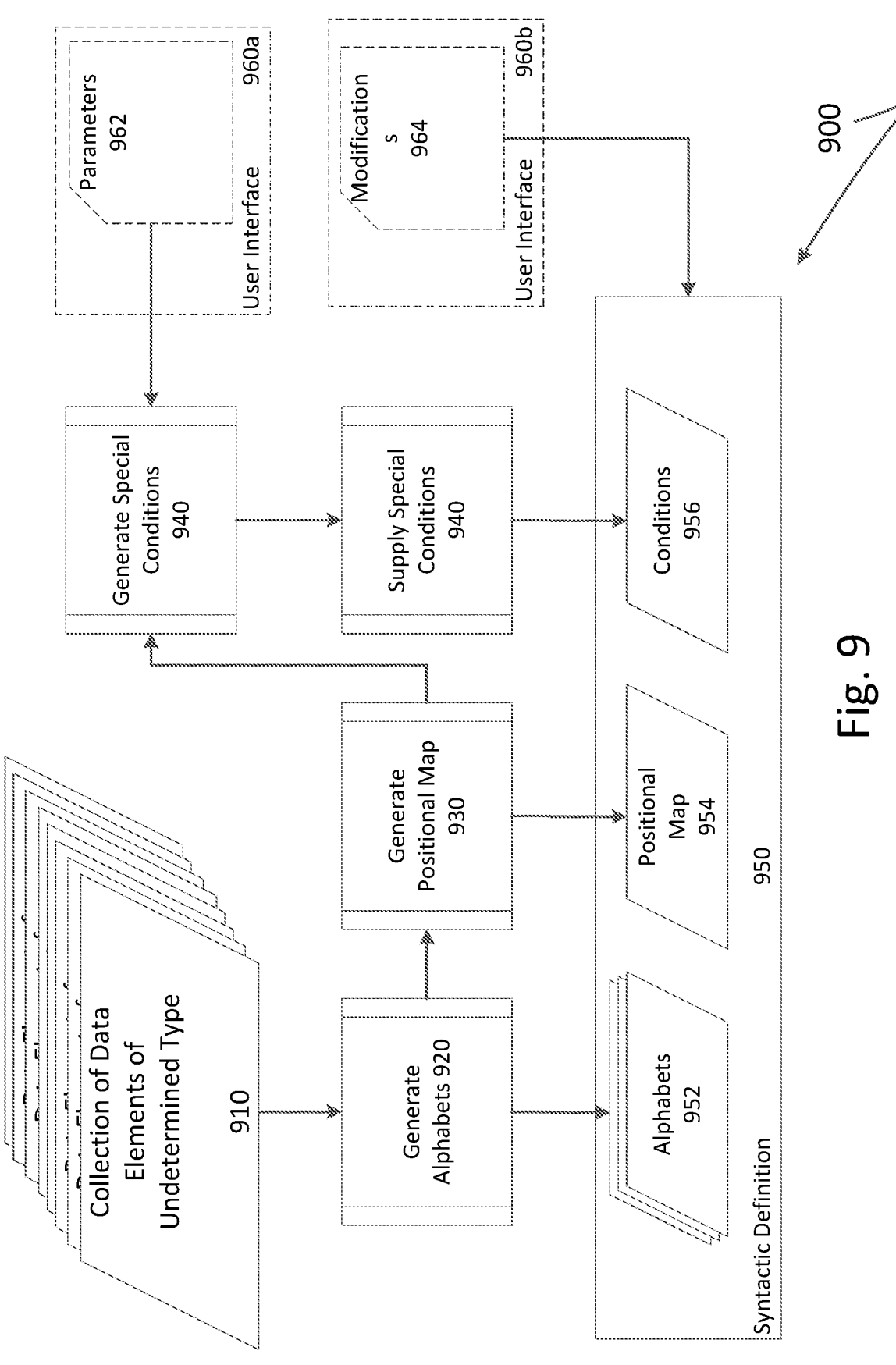
FIG. 9 illustrates a functional flow block diagram for generating a syntactic definition characterizing data elements for use in data masking according to an exemplary embodiment.

FIG. 9 illustrates an example of generating a data masking syntactic definition for a data element of an unknown type by way of a functional flow block diagram of an exemplary embodiment 900. A collection of data elements of an unknown data type 910 are to be masked.

The data elements 910 are analyzed in order to generate 920 one or more alphabets 952. The one or more alphabets correspond to one or more element member positions of the data element and are generated based at least in part on element members occurring at each element member position in a plurality of data elements of the unknown type, for example, the collection of data elements 910. As discussed further below, each alphabet comprises a set of one or more sequential element members that have occurred in the plurality of data elements at an element member position These alphabets are each mapped to a data element position in order to generate 930 a positional map 954. As discussed in greater detail below, this step includes generating a positional map describing a syntactic structure of the data element by mapping at least one of the one or more alphabets to each element member position of the data element.

Further analysis can be conducted in order to generate 940 special conditions, or a user can supply specific parameters 962, for example via a user interface 960a, in order to generate 940 special condition, but in either case the special conditions 956 can be added to the syntactic definition 950. It will be appreciated that a user can also supply modifications 964, also via a user interface 960b or otherwise. Each special condition can map one or more affected element member positions in the data element to a conditional subset of one or more alphabets mapped to the one or more affected element member positions, the conditional subset being triggered by a presence of one or more trigger element members at one or more trigger element member positions in the data element.

In the situation where data elements 910 have different data element lengths (data element length is a measure of the number of element member positions), each group of data elements having the same length can be processed separately. This can include dividing the set of data elements into a plurality of groups of data elements based on the data element length of each data element in the set of data elements, and performing the steps of generating alphabets 920, generating a positional map 930, and generating special conditions 940 for each group in the plurality of groups.

Figure 10:
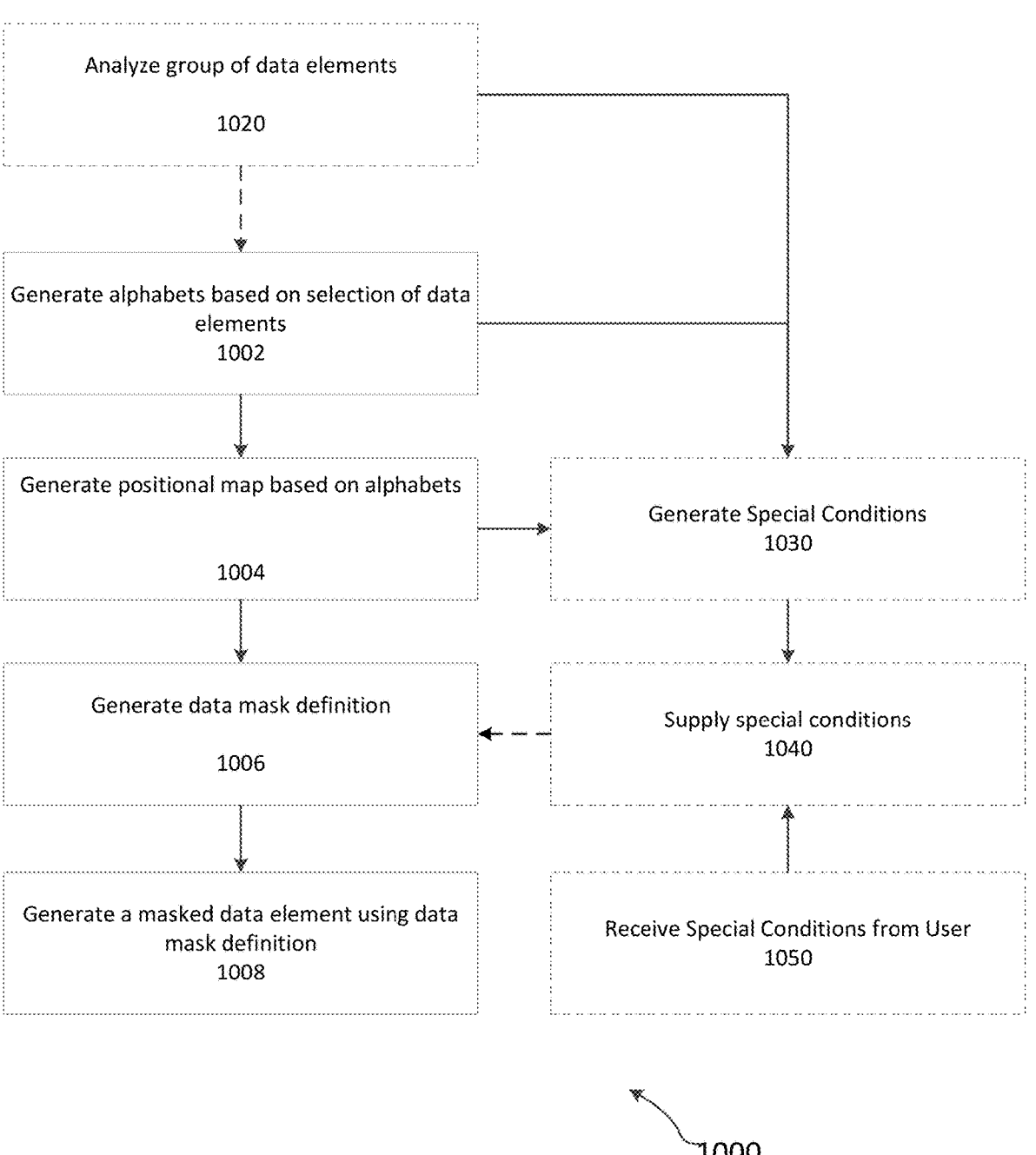
FIG. 10 illustrates a flowchart for a method for generating a masked data element using a newly generate syntactic definition according to an exemplary embodiment.

FIG. 10 illustrates a flow chart 1000 that describe the process of generating a masked data element based on a data type automatically generated for a set of data elements having an unknown data type. First, a set of alphabets are generated based on a selection of the unknown data elements 1002. Then a positional map is generated 1004 which maps one or more alphabets to each position associated with the set of data elements. For example a social security number can consist of 11 positions, xxx-xx-xxxx, consisting of nine positions containing decimal value data elements, and two positions that include only the dash "-". Thus, alphabets containing decimal value symbols are mapped to nine positions, and the alphabet containing only a dash is mapped to two positions.

It will be appreciated that further analysis of the data elements can be conducted 1020 to identify trends in the data. For example it can be that whenever an element from an exemplary alphabet A appears in position 2 of a positional map, only values from alphabet C appear at position 8 of the same positional map, and only when values from alphabet B appear at position 2 of the positional map, do values from alphabet D appear at position 8. This analysis, and the alphabets and the positional map, can each be considered when optionally generating special conditions 1030.

The resulting alphabets and positional map are then included in a data mask definition 1006, which can also include special conditions supplied 1040 as a result of an analysis done 1020, or special conditions can be received directly from a user 1050, for example via a user interface. Lastly, a masked data element is generated 1008 from a data element to be protected using the newly created data type definition created at step 1006, for example according to the process illustrated in FIG. 2.

FIG. 11 illustrates a flow chart 1100 that describes a process of generating a data type definition to serve in generating masked data elements based on a data type syntactic definition automatically generated for a set of data elements having an unknown data type. First, each data element from a selected set of data elements is evaluated to generate a set of dictionaries corresponding to each data element member position 1102. Each dictionary can be constructed by first evaluating a data element and recording each data element member symbol that appears at each data element position along with the count of the number of times that symbol has appeared at the respective position. The processing of generating dictionaries 1102 is complete when the system determines that all the possible symbols that can appear at each position has been identified, which can for example be determined by any suitable means. Once a dictionary is complete for each data element member position, the symbols that appear at each position can be organized into sets of sequential values. Thus it will be appreciate that each position can have one or more associated sets of sequential values. Having established a full set of sequential values for each member position, the sequential values sets can be compared with each other sequential value set and redundant sets are ignored, thereby a set of generally applicable alphabets is generated 1106. Optionally, any suitable outlier detection method can be applied 1108 relying on the information in the dictionaries and alphabets in order to remove outlier alphabets that can be the result of, for example, typos that occurred when the data elements were entered into the system, or any other reason a defect or artifact can be included a set of data elements.

Having obtained a set of alphabets by which every element member position can be described, a positional map is generated 1110 which maps each position to one or more alphabets. Having generated the alphabets and a positional map a data type definition is generated 1112 which can be utilized for example in generating masked data elements of original data elements which are desired to be protected. Optionally, the dictionaries, the alphabets and the data type definition can all or each be compared with known data types in order to evaluate the similarity with known data types 1116. When the similarity is determined to be high, a system can for example decide that the set of unknown data type data elements belong to a known data type and the known data type definition can be used in lieu of the newly generated data type. It will also be appreciated that having determined a data type definition, a regular expression can be generated 1114 which describes the new data type definition.

Figure 12:
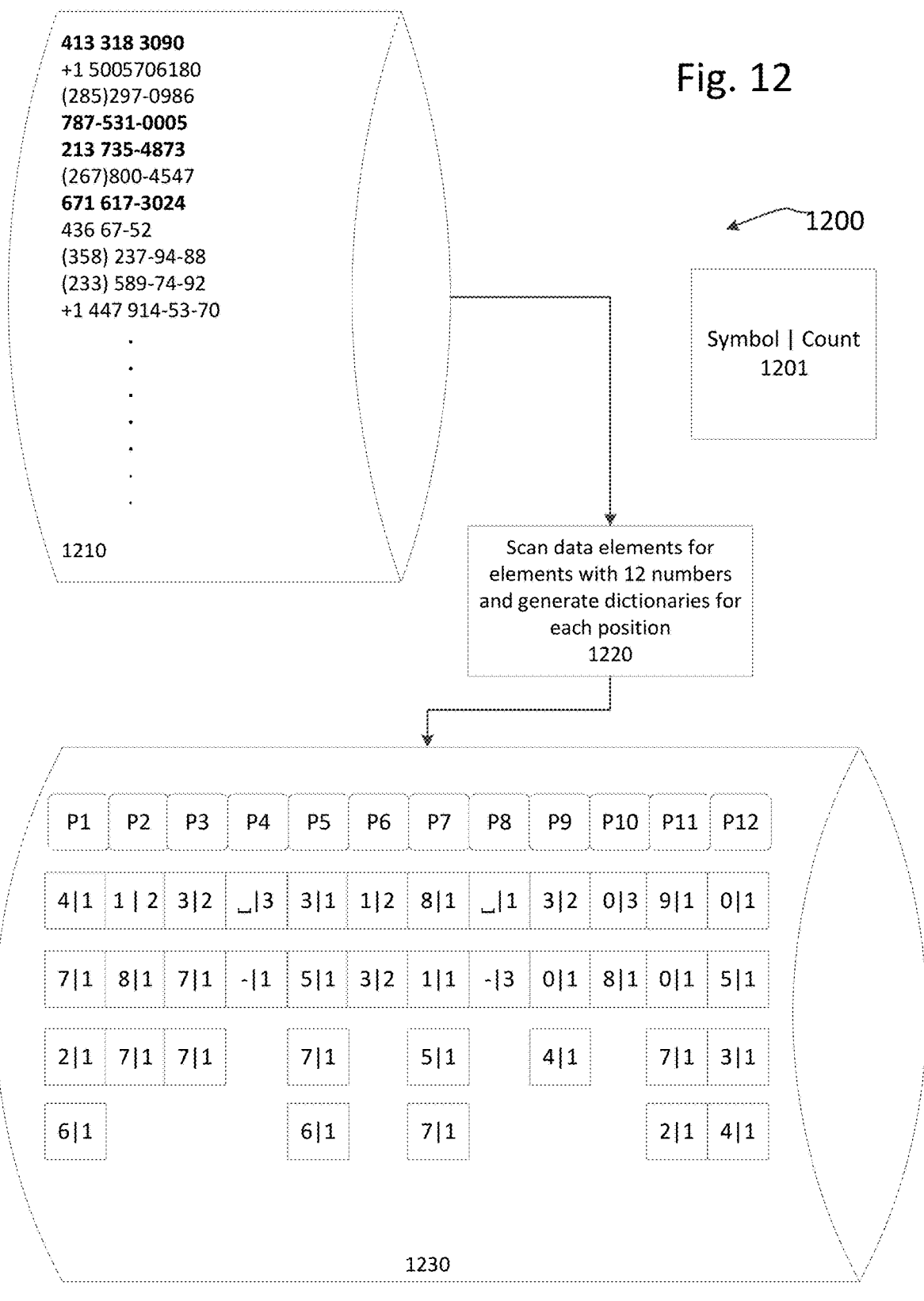
FIG. 12 illustrates a functional flow block diagram for generating a partial set of dictionaries for each element member position of a data element type according to an exemplary embodiment.

FIG. 12 illustrates a functional flow block diagram 1200 for generating a partial set of dictionaries for each element member position of a data element type according to an exemplary embodiment. For example a set of data elements of various types 1210 can be scanned in order to generate dictionaries that describe each position 1220. While scanning, the system can distinguish between data elements that contain different numbers of data members, for example FIG. 12 illustrates the process by scanning the data elements to select only data elements having a length of 12 member positions.

It will be appreciated that the process of generating a masking definition can then be repeated for each data element length. The system upon recognizing a data element of a particular length, for example data elements with length 12, then generates a set of dictionaries for each data element member position. This is illustrated in FIG. 12 by the partially constructed set of dictionaries which describe the symbols that appear at each data element member position. Referring to index 1201, each potential symbol appearing at a particular position in dictionary 1230 is represented by the symbol and a count of how many times that symbol has appeared at that particular position according to the following syntax: "Symbol Count". Partial dictionary 1230 includes the symbols and associated counts for each length (12) data element included in the set of data elements 1210 within the first eleven data element to be scanned (i.e. those shown explicitly in set 1210, with length(12) data elements in bold for ease of understanding). For example, position P1 of partial dictionary 1230 contains four observed data element member symbols appearing at position P1: 4, 7, 2, 6; and, each of the symbols observed at position P1 during the partial scan illustrated have been observed one time. Whereas, at position P10 only two symbols have so far been observed during the illustrated partial scan: 0 and 8, where 0 has been observed three times and 8 has been observed once. This scanning will continue until the system has determined that it has observed all possible symbols appearing at a particular data element member position.

FIG. 13 illustrates a functional flow block diagram 1300 for generating a set of dictionaries and special conditions of a data element type according to an exemplary embodiment. In particular, FIG. 13 illustrates how a set of dictionaries can be constructed, how trends can be analyzed in the data elements observed, and how a set of special conditions can be generated. A scan of data element will continue to retrieve new data elements 1320 from a set of data element 1310, and each time a data element is retrieved, the observed symbols are each allocated to their respective dictionaries (for example, as illustrated in FIG. 12). Data objects samples collection continues till either all available data objects have been considered or when the rate of gain of joint informational entropy for all data element positions of the data elements crosses chosen statistical significance level or threshold after a predetermined number of the data object instances has been processed.

For example, each time an element is retrieved 1320, the dictionaries can be evaluated to determine the amount informational entropy as a result of each update to the dictionaries 1320. Once an element has been retrieved and the dictionaries updated, the entropy can be computed 1330, and the result can be compared to a threshold 1360. If the threshold is not met, the process is reiterated; if the threshold is met, then the scan is complete and a complete set of dictionaries 1350 is obtained. It will be appreciated that during this process, the data elements can be otherwise observed and analyzed for trends 1360, which can be utilized to generate 1370 special conditions 1375 that describe the relationships between the data element positions in terms of the dictionaries 1350.

In a scenario relying on informational entropy to determine the statistical significance of each successive data element observed, the information entropy can be computed as $H = -\Sigma_i p_i \log_2 p_i$, where summation is done for each dictionary symbol observed a given position in each data element retrieved and observed, where $p_i$ is the probability of the i-th representative symbol to be found at a given data element position. This probability is computed as a ratio of occurrences of the i-th dictionary symbol observed to a total number of observed dictionary symbols at that position.

Joint informational entropy is computed as a sum of informational entropy values for each position in the data element type.

In an exemplary embodiment a statistical significance level a is set at α<0.01 and the joint informational entropy computation threshold can be 100,000 instances. Selection of the algorithm parameters in that manner can for example provide a confidence interval that all symbols in all dictionaries for all data element member positions for data members of a particular data type have been observed. It is appreciated that other values of statistical significance level and joint informational entropy computation threshold can be used.

As discussed earlier, each special condition maps one or more affected element member positions in the data element to a conditional subset of one or more alphabets mapped to the one or more affected element member positions, the conditional subset being triggered by a presence of one or more trigger element members at one or more trigger element member positions in the data element. Special conditions can be generated by receiving one or more parameters from a user via a user interface, the parameters indicating the one or more affected element member positions, the conditional subset, and the one or more trigger element members at the one or more trigger element member positions which trigger the conditional subset and generating the special conditions based at least in part on the received one or more parameters. Additionally or alternatively, the special conditions can be generated without user input. This can include determining one or more first element members occurring at one or more first element member positions in the plurality of data elements when one or more second element members occur at one or more second element member positions in the plurality of data elements, determining whether the one or more first element members include all members of one or more first alphabets mapped to the one or more first element member positions, and setting the one or more affected element member positions to be the one or more first element member positions, the conditional subset to be the one or more first element members, the one or more trigger element members to be the one or more second element members, and the one or more trigger element member positions to be the one or more second element member positions based at least in part on a determination that the one or more first element members do not include all members of one or more first alphabets mapped to the one or more first element member positions. The process for generating special conditions is explained further with respect to FIG. 20.

FIG. 14 illustrates an exemplary set of dictionaries 1400 generated for each position of a data element of an unknown type according to an exemplary embodiment. The set of dictionaries can be generated based least in part on element members occurring in a plurality of data elements of the unknown type at each of a plurality of element member positions. For simplicity the counts associated with each symbol in each of the alphabets 1420 at each of the positions 1410 are ignored in FIG. 14. Each dictionary in the set of dictionaries 1500 includes element members occurring at a corresponding element member position in the in the plurality of data elements. For example, dictionary 1420a includes element members 2, 3, 4, 5, 6, 7, 8, and 9. This means that element members 2, 3, 4, 5, 6, 7, 8, and 9 all occurred at position P1 in the plurality of data elements of the unknown type. Dictionary 1420a does not include element member 1. This means that element member 1 did not occur at position P1 in the plurality of data elements of the unknown type.

Observe that positions P1 and positions P5 are associated with equivalent dictionaries 1420a and 1420e (in terms of the symbols observed). Similarly, positions P4 and P8 also are associated with equivalent dictionaries 1420d and 1420h. Lastly, observe that positions P2, P3, P6, P7, P9, P10, P11, P12 also are associated with equivalent dictionaries (1420b, 1420c, 1420f, 1420g, 1420i, 1420j, 1420k, and 1420l.

Figure 15:
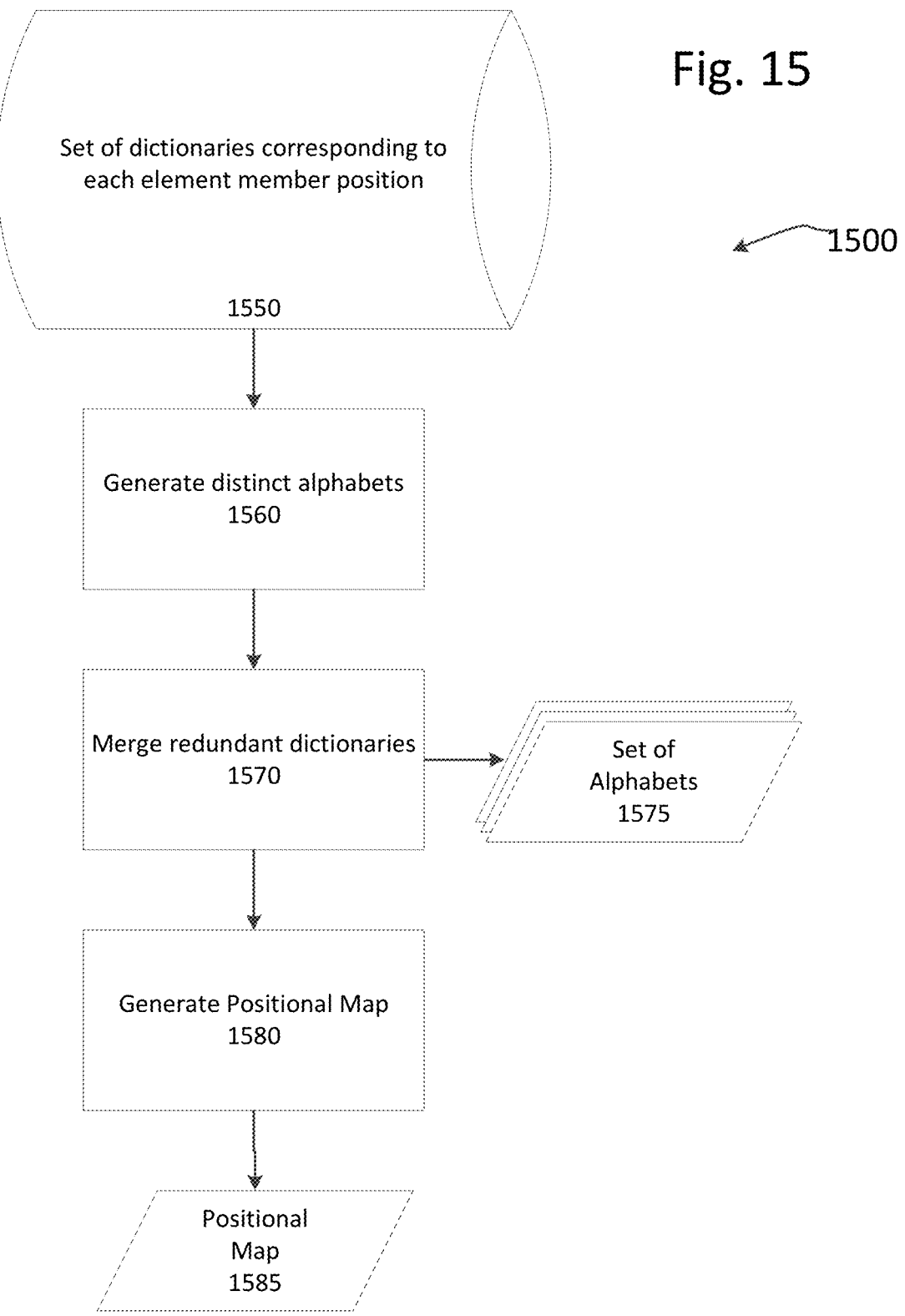
FIG. 15 illustrates a functional flow block diagram for generating a set of alphabets and a positional map describing a data element type according to an exemplary embodiment.

FIG. 15 illustrates a functional flow block diagram 1500 for generating a set of alphabets and a positional map describing a data element type according to an exemplary embodiment. Having generated a set of dictionaries 1550 describing each of the symbols that can appear at a particular data element member position, a set of distinct potential alphabets is generated 1560 by organizing the symbols within each dictionary into sets of consecutive values. A plurality of potential alphabets is generated by, for each dictionary in a plurality of dictionaries, generating one or more sets of sequential element members such that the union of the one or more sets of sequential element members includes each element member in that dictionary, the one or more sets of sequential element members corresponding to one or more potential alphabets in the plurality of potential alphabets. For example, dictionary 1420a is organized into the potential alphabet {2, 3, 4, 5, 6, 7, 8, 9}, while dictionary 1420d is organized into potential alphabets {-} and { ˽ }. By generating each set of consecutive numbers from each dictionary the system generates a set of potential distinct alphabets 1560.

The potential alphabets are then merged into a final set of alphabets. This can include merging redundant alphabets 1570 to obtain a final set of alphabets 1575 which can be incorporated into a syntactic definition. For example, referring to the set of dictionaries in FIG. 14, dictionaries 1420a and 1420e result in one set of consecutive values each (i.e. set {2, 3, 4, 5, 6, 7, 8, 9}) and recognizing that each set is identical, dictionaries 1420a and 1420e result in a single alphabet comprising the consecutive set {2, 3, 4, 5, 6, 7, 8, 9}, while dictionaries 1420d and 1420h each result in two identical sets {-} and { ˽ }, each of which then comprises an alphabet in the set of generated alphabets 1575. Merging the potential alphabets can also include applying an outlier detection test to the plurality of potential alphabets to remove any potential alphabets which are outliers relative to the plurality of potential alphabets.

Then, having obtained the set of alphabet 1575, each position (for example P1-P12 in FIG. 14) is mapped to one or more alphabets to generate 1580 a positional map 1585.

Figures 16, 17:
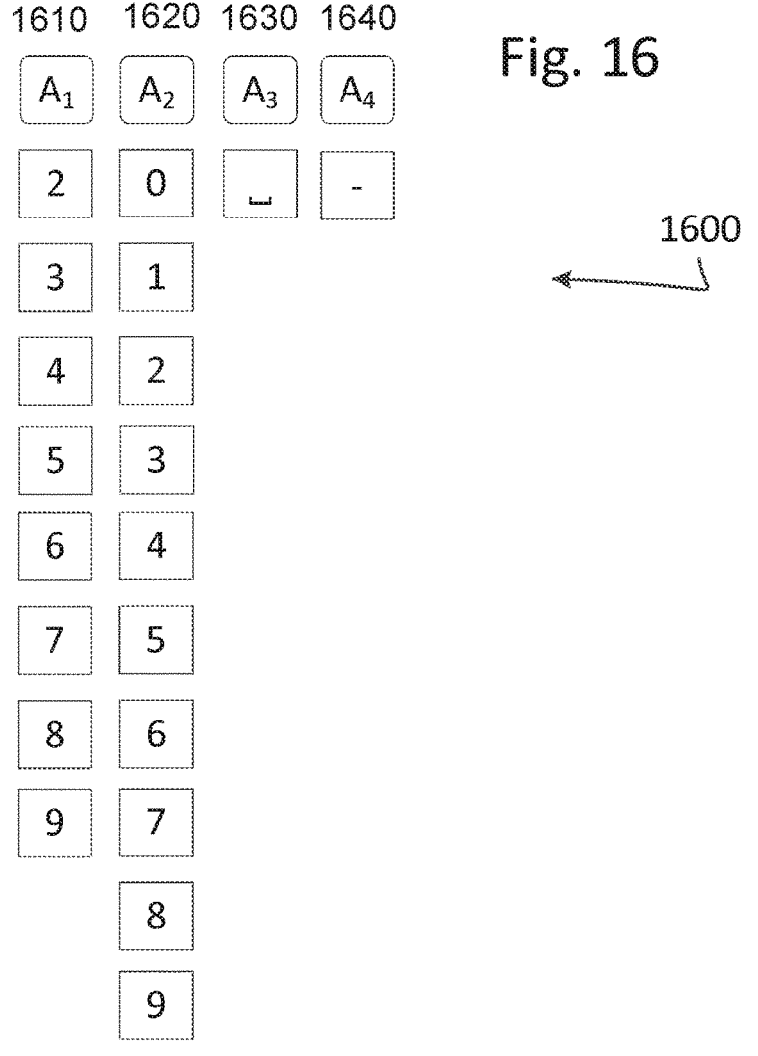
FIG. 16 illustrates an exemplary set of alphabets according to an exemplary embodiment.
FIG. 17 illustrates an exemplary positional map according to an exemplary embodiment.

FIG. 16 illustrates an exemplary set of alphabets 1600 according to an exemplary embodiment. The exemplary set of alphabets 1600 are the alphabets which would be generated based on the examples in FIG. 14 and FIG. 15. FIG. 17 illustrates an exemplary positional map 1700 according to an exemplary embodiment, which exemplary positional map 1700 would be generated following the examples set out in FIG. 14, FIG. 15, and FIG. 16. Generating a positional map can include, for each member element position, identifying at least one potential alphabet in the plurality of plurality of potential alphabets which corresponds to that member element position, identifying at least one alphabet in the set of alphabets matching the identified at least one potential alphabet, and mapping the identified at least one alphabet to that element member position.

For example, as shown in FIG. 14, the dictionary 1420*a* includes the set {2, 3, 4, 5, 6, 7, 8, 9}, which will result in a potential alphabet {2, 3, 4, 5, 6, 7, 8, 9}. This potential alphabet corresponds to position P1. Additionally, final alphabet 1610 in FIG. 16 matches this potential alphabet. Therefore, final alphabet 1610 will be mapped to position P1.

As can be seen in FIG. 17, positions P1 and P5 are mapped to alphabet A$_1$, which includes the set {2, 3, 4, 5, 6, 7, 8, 9}, which is the set of symbols contained in dictionaries 1420*a* and 1420*e*, whereas positions P4 and P8 are mapped to alphabets A$_3$ and A$_4$, respectively containing sets { ˽} and {-}, which correspond to the symbols found in dictionaries 1420*d* and 1420*h*.

Figures 18, 19:
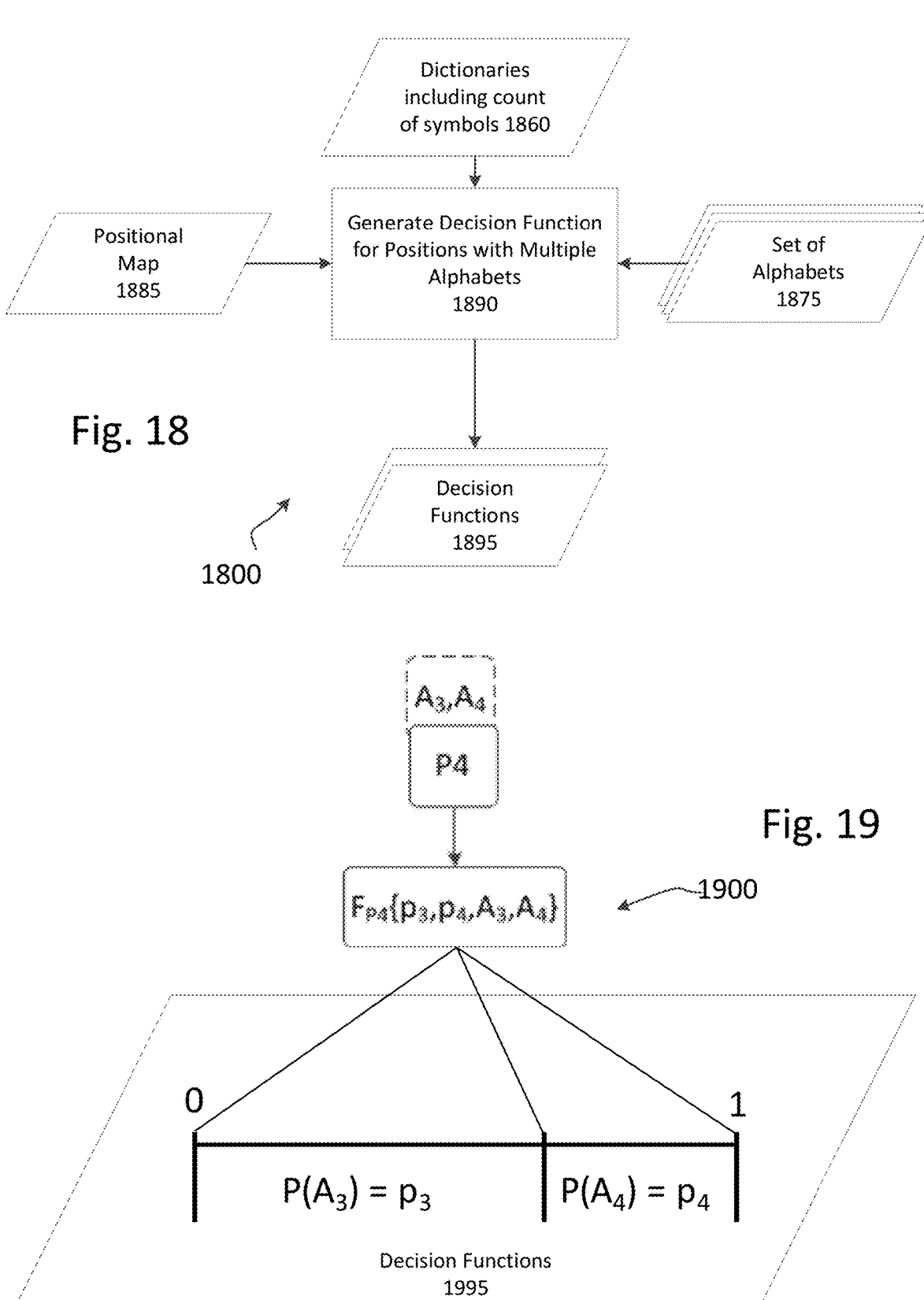
FIG. 18 illustrates a functional flow block diagram for generating a set of decision functions for positions associated with multiple alphabets according to an exemplary embodiment.
FIG. 19 illustrates an exemplary decision function for selecting an alphabet to apply for a position associated with multiple alphabets according to an exemplary embodiment.

FIG. 18 illustrates a functional flow block diagram 1800 for generating a set of decision functions for positions associated with multiple alphabets according to an exemplary embodiment. In this exemplary embodiment, the system evaluates the symbols observed and their count to determine one or more decision functions 1895 that, for example, a data masking system can rely on to decide which alphabet to rely on when generating a masked data element when a data element position is mapped to more than one alphabet, for example as illustrated in FIG. 7*b*. For example in order to generate the decision functions 1890, the system can consider or analyze the dictionaries and associated data element counts 1890, the set of alphabets 1875, and the positional map 1885 to generate 1890 the decision functions 1895. It will be appreciated that any suitable analysis of the data elements can be relied upon to generate the decision functions, or alternatively the decision functions can be generated based on user input or other relevant data. For example, a weighting factor can be generated and associated with each alphabet within the set of alphabets 1875, where the weighing factor is based on the number of observations of symbols as identified by the counts associated with each dictionary 1860.

FIG. 19 illustrates an exemplary decision function 1900 for selecting an alphabet to apply for a position associated with multiple alphabets according to an exemplary embodiment. For example F$_{P4}$ can be one of a number of decision functions, or can include a piecewise function including one or more functions. For illustrative purposes, to determine a decision function, the system can consider the ubiquity of each alphabet appearing in the data object at a given position by computing the probability of that alphabet appearing in the a data element, by adding up all the counts of all the symbols in a dictionary, and dividing the sum by a total number of observed data objects of the type in question.

Figure 20:
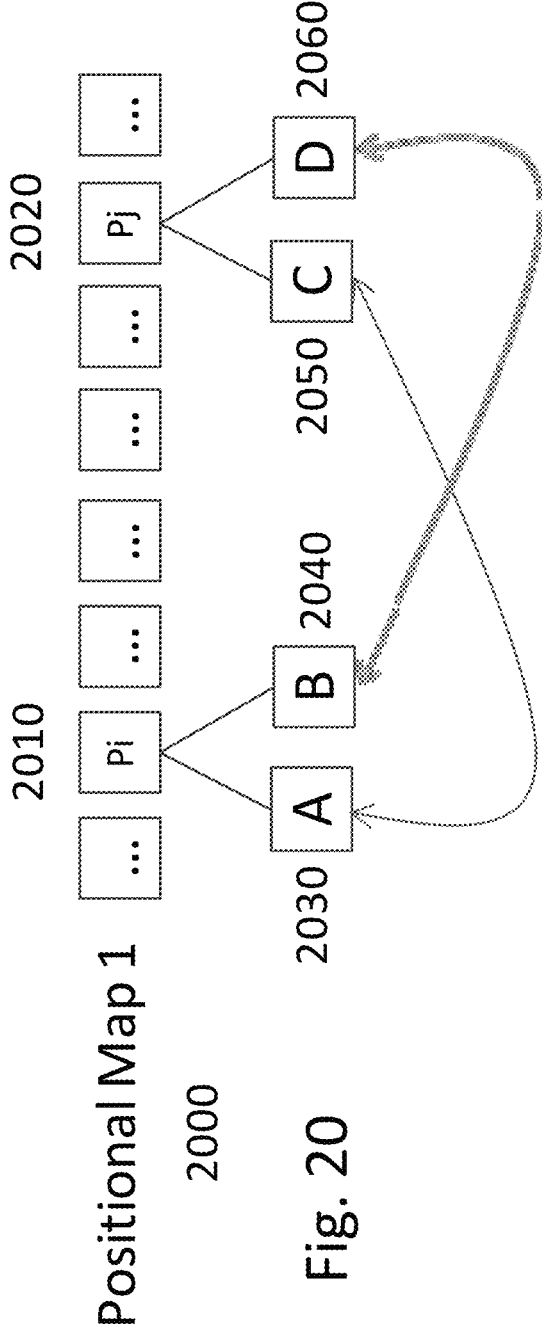
FIG. 20 illustrates an exemplary observation for generating a special condition according to an exemplary embodiment.

FIG. 20 illustrates exemplary observations 2000 for generating a special condition according to an exemplary embodiment. The example illustrated can be the result of an analysis performed during the generation of the alphabets, for example analysis 1020 or 1360, resulting in generation of special conditions, for example process 940. Example observations 2000 include an observation that when symbols in alphabet A 2030 appear at position Pi 2010, only symbols in alphabet C 2050 appear at position Pj 2020, and symbols in alphabet D 2060 never appear at position Pj 2020 when symbols in alphabet A 2030 appear at position Pi 2010. Likewise, another exemplary observation in observations 2000 recognize that when symbols in alphabet B 2040 appear at position Pi 2010, only symbols in alphabet D 2060 appear at position Pj 2020, and symbols in alphabet C 2050 never appear at position Pj 2020 when symbols in alphabet B 2040 appear at position Pi 2010.

Figures 21, 22:
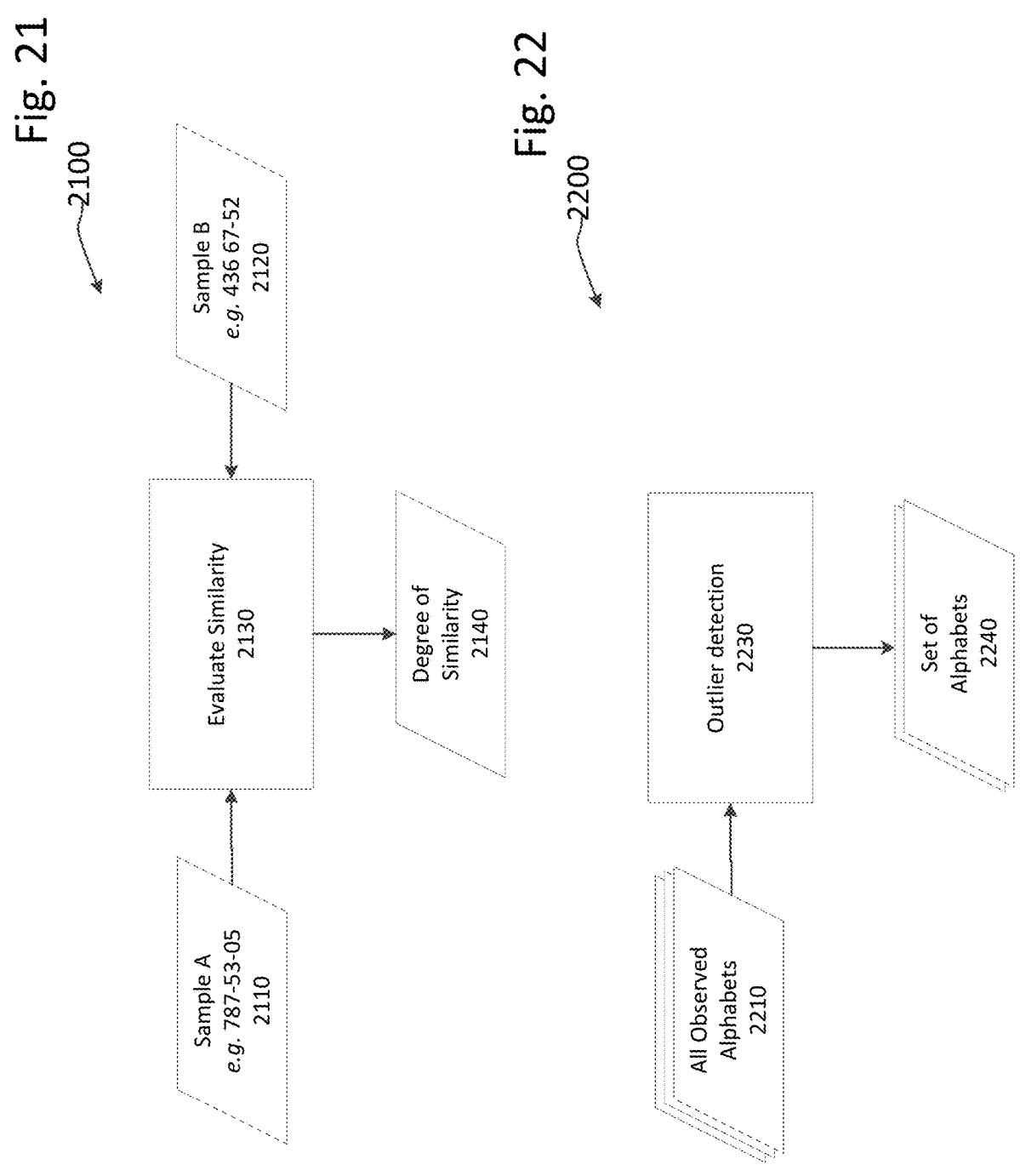
FIG. 21 illustrates a functional flow block diagram for generating a degree of similarity between an unknown data element and a known data type according to an exemplary embodiment.
FIG. 22 illustrates a functional flow block diagram for removing outlier alphabets according to an exemplary embodiment.

FIG. 21 illustrates a functional flow block diagram for generating a degree of similarity between an unknown data element and a known data type according to an exemplary embodiment. For example at step 1116 illustrated in FIG. 11, the system or method can determine the similarity of objects to determine if unknown objects are of a known data type, and thereby simplify the process of generating a data mask for the set of unknown data elements. If, for example, sample B 2120 is one of a set of known data elements, and sample A 2110 is of an unknown data type, the similarity between the unknown data element can be evaluated against sample B to generate a degree of similarity 2140. It will be appreciated that this degree of similarity 2140 can be generated for each data element of a set of unknown data elements in order to enable the system to determine if the unknown data elements are of a known data type, for example the data type to which sample B 2120 belongs.

Discovering similarity between data objects and can provide guidance for discerning the semantics of previously unknown data object types. This is useful, for example, to determine the syntactic definition of a set of unknown data elements. In an exemplary implementation the similarity between data objects A and B can be computed using the Jaccard distance metric $$d_J = 1 - J(A, B) = 1 - \frac{|A \cap B|}{|A \cup B|}.$$

It will be appreciated that similarity can be effectively determined between data elements of different lengths.

In a first step of distance computation the shorter of two data elements can be extended to match the size of a longer data object of the pair and the added slots in its positional map are pointed to an empty alphabet. Then the Jaccard distance can be computed for each position in the positional map and computed distances can then be summed. The result of summation indicates a degree of similarity between data elements, for example data elements 2110 and 2120. A smaller distance value corresponds to a more syntactically similar data objects while a larger value indicates disparity between two data objects' types.

If the degree of similarity 2140, for example a Jaccard distance metric between data object types represented by sample A 2110 and sample B 2120, is small or equal to 1, and if the semantics of data object type represented by sample B 2120 are known, then the system can algorithmically conclude with a high degree of probability that sample A 2110 belongs to the same type of data as sample B 2120 thus automatically classifying sample A 2110.

It is appreciated that use of Jaccard distance for determining similarity between two instances of FPT attributes is exemplary. Any suitable similarity metrics, such as Tanimoto similarity, can be used for this purpose.

FIG. 22 illustrates a functional flow block diagram removing false alphabets according to an exemplary embodiment. For example at step 1108 illustrated in FIG. 11, the system can try to identify outlier alphabets, which can be the result of an error in data entry or data processing. For example if a data set contains social security numbers of the form xxx-xx-xxxx but at position 4 a*appears in one data element of a million observed data elements, an outlier detection will determine that the data element of form xxx*xx-xxxx contains a defect or artifact and can be ignored or otherwise handled. It will be appreciated that in some cases a special condition can be generated that accounts for the fact that one knowledgeable of the underlying data might expect that there are defects or artifacts in the underlying data and want to include occasional errors in order to obfuscate a resulting masking process. That is, one might become suspicious of finding no errors in a set of masked data where one would expect to find an occasional error. For example, one can apply Grubb's outlier detection test to the symbols within an alphabet or dictionary to evaluate whether a particular symbol or alphabet is noise and therefore could be eliminated. By applying this test recursively all alphabets deemed irrelevant to a data element can be removed. It is appreciated that other outlier detection tests such as Dixon's Q test can be used for this purpose. It is also appreciated that a simple threshold ubiquity value can be used to determine a cutoff point of determining alphabet's relevancy.

Figure 23:
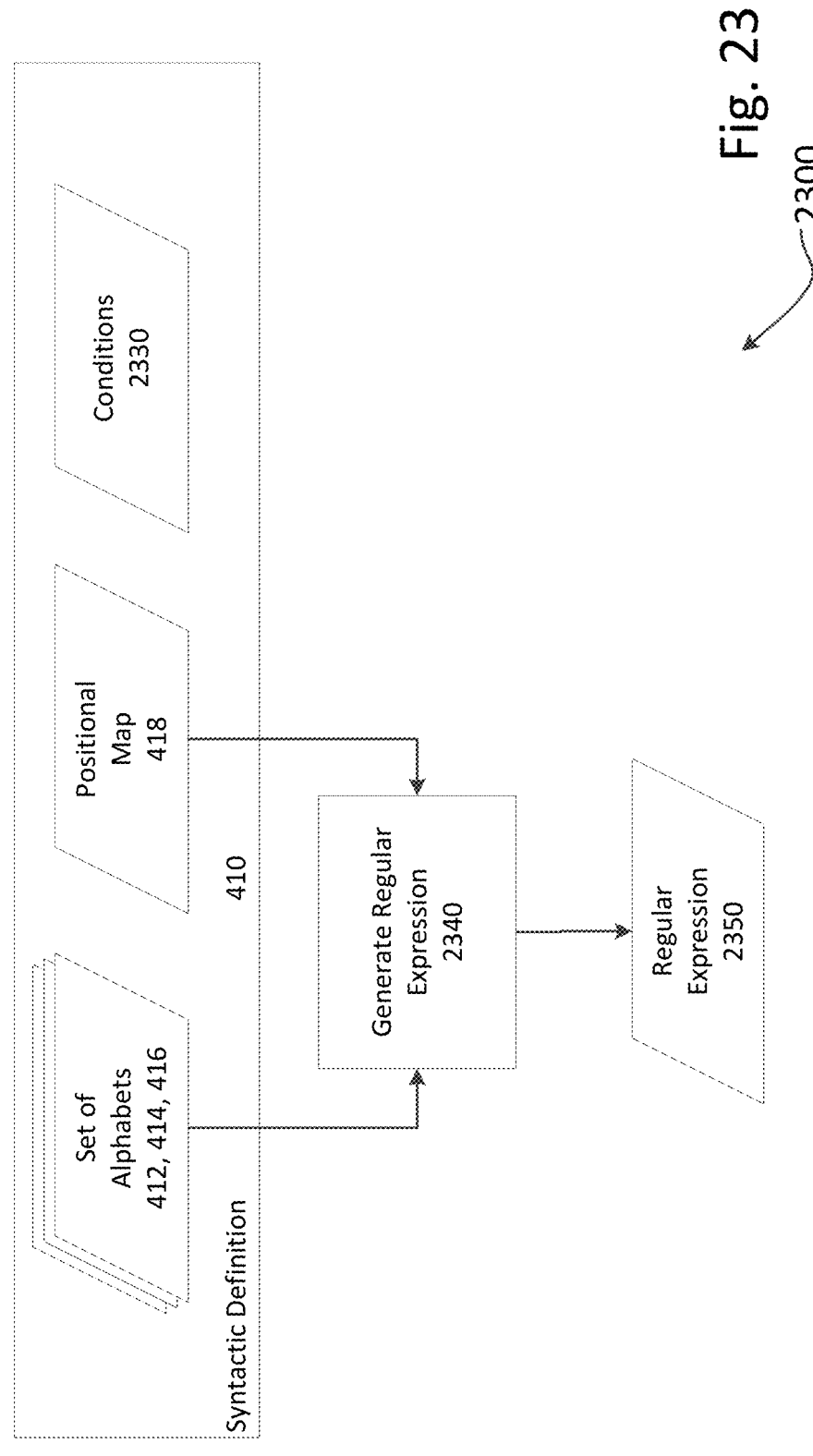
FIG. 23 illustrates a functional flow block diagram for generating a regular expression characterizing a data type syntactic definition according to an exemplary embodiment.

FIG. 23 illustrates a functional flow block diagram for generating 2340 a regular expression 2350 characterizing a data type syntactic definition according to an exemplary embodiment. This can for example be useful for use in legacy type systems that rely on traditional data profiling methods, or for other situations in which a regular expression is useful. Automatically constructed data definitions can be utilized to automatically create regular expressions for use in traditional data profiling systems. Translation between a constructed syntactic definition and a regular expression can be accomplished by translating each object in the positional map and the associated alphabets into a regular expression character set. For example, referring to the syntactic definition 410 illustrated in FIG. 4a, an equivalent regular expression 2350 is created by expressing each alphabet 412, 414, 416 at each positional of positional map 418 as a regular expression character set of the form [X-Y] where X is a first character in an alphabet 412, 414, 416 and Y is a last character in alphabet 412, 414, 416. The resulting regular express 2350 then generated 2340 as: ^[2-9][A-Z][A-Z][A-Z][0-9] [0-9] [0-9].

Further referring to FIG. 7, it is appreciated that simple regular expression 704 can be further optimized to reduce the number of tested character sets such as combining three rightmost character sets in said regular expression 704 into a single character set [000-999].

It is also appreciated that FPT special conditions, like special condition 703 presented on FIG. 7, can in some cases be expressed by the means of regular expressions while in more complex scenarios, such as credit card number verification utilizing a Luhn check, FPT special conditions cannot be translated into equivalent regular expressions.

Figure 24:
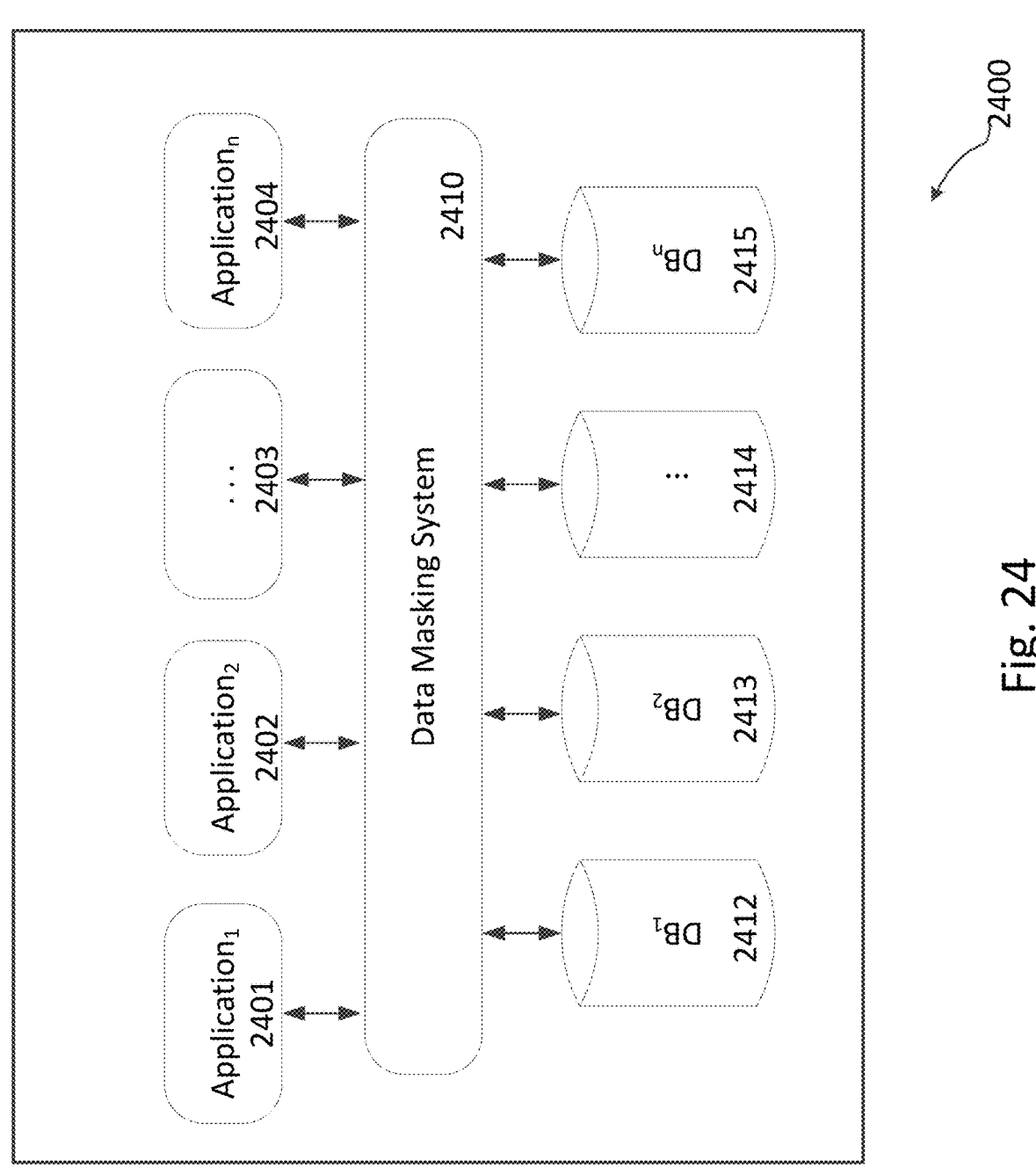
FIG. 24 is a functional block diagram of a system according to an exemplary embodiment.

Referring to FIG. 24, multiple applications 2401, 2402, 2403, 2404, can seek to access data stored, for example, in one or more databases 2412, 2413, 2414, 2415. In an embodiment, the applications are configured to request data in a way that the request is routed through the data masking system 2410, alternatively, the data masking system can intercept requests by applications 2401, 2402, 2403, 2404 to the databases 2412, 2413, 2414, 2415 and handle the requests in a manner that is transparent to the application or a user of the application. In an embodiment, the applications are configured to utilize a designated port for database connections, and the system 2410 is configured to listen to those ports to receive incoming data requests. Alternatively the data masking system 2410 can be configured as a proxy to which the applications 2401, 2402, 2403, 2404 are configured to transmit database requests.

The databases shown in FIG. 24 can store sensitive data and the data masking system can be used to present the user with only masked data. Where necessary the system can generate a new data mask definition in order to mask requested data.

Alternatively, the databases shown in FIG. 24 can data stored in a masked format and the data masking system can be used to allow the user to add data to the database. In this case, the system can generate a new data mask definition in order to update the databases or create new records in the databases.

Figure 25:
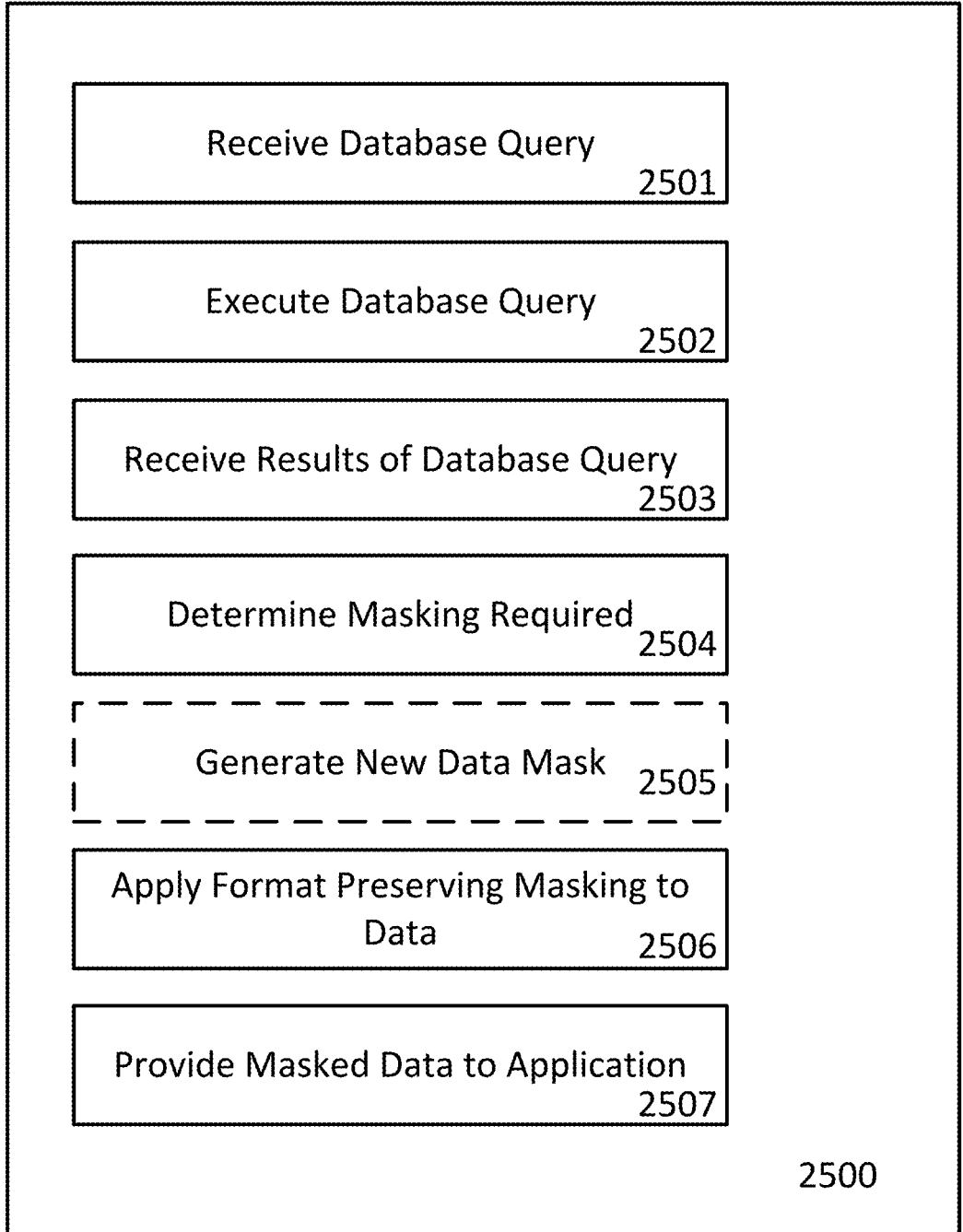
FIG. 25 is a functional block diagram of a system according to an exemplary embodiment.

FIG. 25 illustrates steps performed by a system 2500 implementing the masking system in the context of a database query. At step 2501 the system receives a database query from a request application, for example application 2401, and at step 2502 the database query is executed, for example on database 2415. At step 2503 the results of the database query are received at the system and at step 2504 a determination is made by the system as to what data requested and received requires masking. At step 2506 the system applies format preserving masking to the received data and at step 2507 the masked data is provided to the application. If the requested data is of an unknown data type, the system can generate a new data mask at step 2505. This can include generating a new syntactic definition for the unknown data type or evaluating the requested data and determining it is of a known data type by applying similarity detection. It will also be appreciated that, alternatively, the decision regarding which data is to be masked can be made before the data is received, enabling the system 2500 to apply format preserving data masking to the received data as it is received into system 2500.

Figure 26:
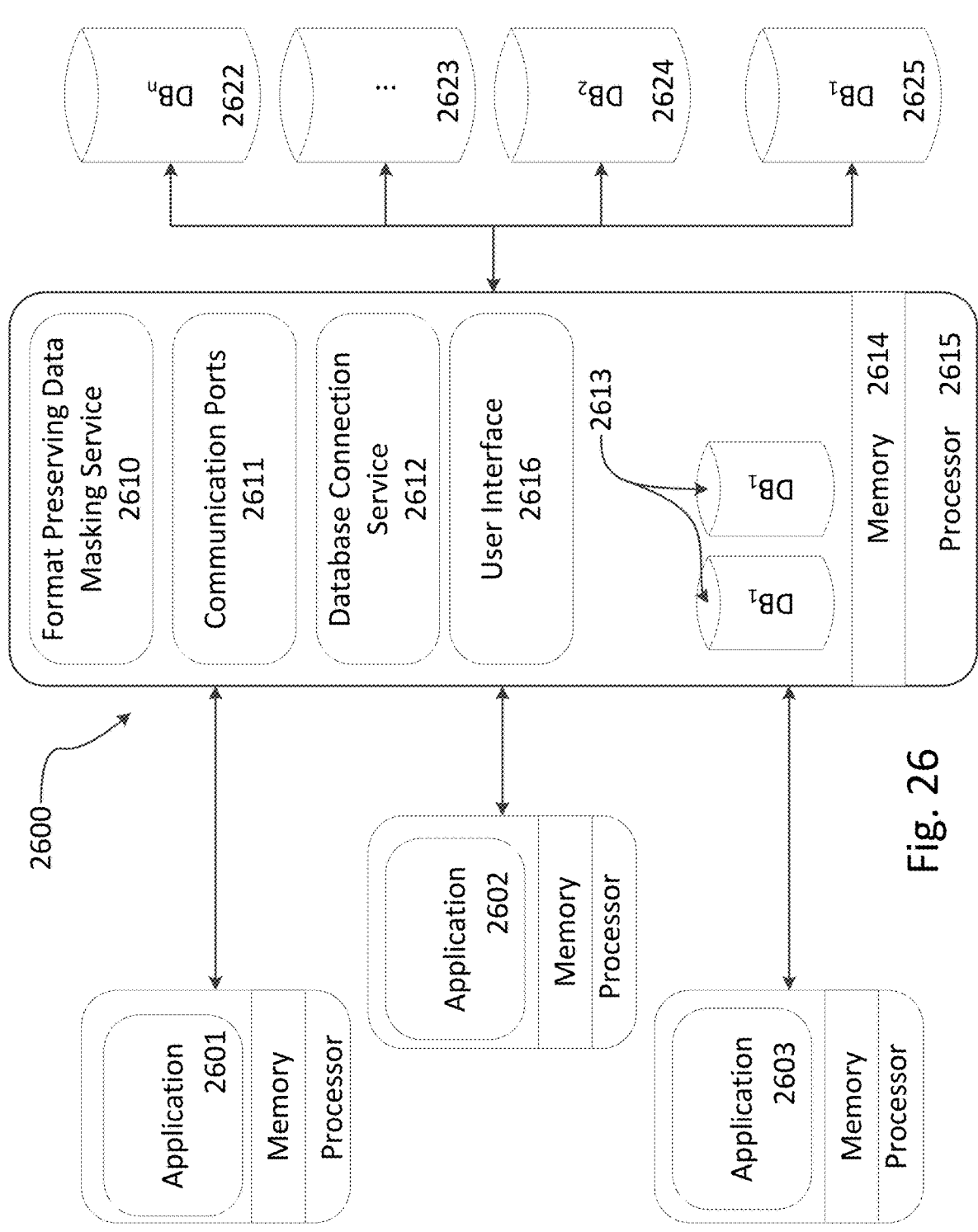
FIG. 26 illustrates an exemplary computing environment that can be used to carry out the method for generating a masked data element from an original data element.

Referring to FIG. 26, illustrates a computing environment including an embodiment 2600 can include a computer having at least a processor 2615 and a memory 2614, a format preserving data masking service 2610, one or more communications ports 2611, a database connection service 2612 (which can include aspects disclosed in the embodiments corresponding to 1001, 1005, 1006), and a user interface 2616. The communications ports 2611 receive queries sent by applications 2601, 2602 or 2603, and send results containing masked data to applications 2601, 2602, or 2603. The database connection service can manage the connections to various external databases 2622, 2623, 2624, 2625, and can also manage database connections to internal databases 2613. The database connection service 2612 receives queries sent to communications ports 2611 and executes those queries on one or more of the databases 2613, 2622, 2623, 2624, and 2625. The database connection service 2612 can communicate with the format preserving data masking service 2610, to inform service 2610 of the data requested, so that service 2610 can determine which data needs masked based on one or more considerations, and which masking should be applied to which requested data also based on one or more considerations. The data masking service 2610 can also determine that requested data is of an unknown type and generate a new data mask based including a new syntactic definition. These considerations can for example be associated with conditions such as the user, the user's authorization, the user's access level, the access level of the requesting application, the authorization level of the application or the machine one which the application is running, the instance of the data element, the database table in which the data element is stored, the database instance, or the particular deployment of the database, and can be maintained within the format preserving data masking service 2610 in the form of one or more parameters. The user interface module 2616 can be further provided to allow configuration of the above-described embodiment and entry and editing of masking parameters by a system administrator.

The various embodiments disclose consist of computer software code recorded on computer readable media and executed by one or more processors. Where the embodiments are disclosed in terms of their function in this description it is for the purpose of clarity of description, but need not be discrete devices or code portions, and can be integrated segregated or integrated in any particular manner. Various computer devices can be used to implement the embodiments such as servicers, PCs, mobile devices, laptop computers, tablets, handheld computing devices or various combinations of these devices. Furthermore, the embodiments need not be implemented in software code, but instead can be hardcoded into, for example, FPGAs, ASIC chips, customized processors, Stretch microprocessors, DSP chips, ARM processors, microprocessors, system on a chip based devices and the like.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments can be used with or perform operations in accordance with the teachings described herein. Elements of the described embodiment shown in software can be implemented in hardware, as discussed above, and vice versa.

In view of the many possible embodiments to which the principles of our invention can be applied, we claim as our invention all such embodiments as can come within the scope and spirit of the following claims and equivalents thereto

We claim:

1. A method executed by one or more computing devices for generating a data masking syntactic definition for a data element of an unknown type comprising:

generating, by at least one of the one or more computing devices, one or more alphabets based at least in part on scanning symbols occurring at a plurality of positions of a plurality of data elements of the unknown type, wherein each alphabet corresponds to one or more positions of the data element and comprises a set of one or more symbols that have occurred at each of the one or more positions of the plurality of data elements; and generating, by at least one of the one or more computing devices, a positional map describing a syntactic structure of the data element by mapping at least one of the one or more alphabets to each position of the data element in a memory of at least one of the one or more computing devices; and generating, by at least one of the one or more computing devices, one or more special conditions, wherein each special condition in the one or more special conditions maps one or more affected positions in the data element to a conditional subset of at least one alphabet mapped to the one or more affected positions.

2. The method of claim 1, further comprising determining the plurality of data elements by:

receiving, by at least one of the one or more computing devices, a set of data elements, the set of data elements having a plurality of different data element lengths, wherein data element length is a measure of the number of element member positions;

dividing, by at least one of the one or more computing devices, the set of data elements into a plurality of groups of data elements based on the data element length of each data element in the set of data elements; and selecting, by at least one of the one or more computing devices, a group of data elements in the plurality of groups of data elements which has a data element length equal to a data element length of the data element as the plurality of data elements.

3. The method of claim 1, wherein the one or more special conditions are generated based at least in part on one or more trends in the scanned symbols occurring at a plurality of positions.

4. The method of claim 1, wherein the data masking syntactic definition comprises the one or more alphabets, the positional map, and the one or more one or more special conditions, and further comprising:

generating, by at least one of the one or more computing devices, a masked data element using the data masking syntactic definition.

5. The method of claim 1, wherein each alphabet comprises a set of one or more sequential symbols.

6. The method of claim 1, wherein generating one or more alphabets based at least in part on scanning symbols occurring at a plurality of positions of a plurality of data elements of the unknown type comprises:

generating a plurality of dictionaries based at least in part on symbols occurring in the plurality of data elements at each of the plurality of positions, wherein each dictionary in the plurality of dictionaries includes symbols occurring at a corresponding position in the plurality of positions;

generating a plurality of potential alphabets by, for each dictionary in the plurality of dictionaries, generating one or more sets of sequential symbols such that the union of the one or more sets of sequential element members includes each symbol in that dictionary, the one or more sets of sequential symbols corresponding to one or more potential alphabets in the plurality of potential alphabets; and merging the plurality of potential alphabets into the one or more alphabets.

7. The method of claim 6, wherein merging the plurality of potential alphabets into the one or more alphabets comprises one or more of:

removing any redundant potential alphabets in the plurality of potential alphabets; or applying an outlier detection test to the plurality of potential alphabets to remove any potential alphabets which are outliers relative to the plurality of potential alphabets.

8. An apparatus for generating a data masking syntactic definition for a data element of an unknown type, the apparatus comprising:

one or more processors; and one or more memories operatively coupled to at least one of the one or more processors and having instructions stored thereon that, when executed by at least one of the one or more processors, cause at least one of the one or more processors to:

generate one or more alphabets based at least in part on scanning symbols occurring at a plurality of positions of a plurality of data elements of the unknown type, wherein each alphabet corresponds to one or more positions of the data element and comprises a set of one or more symbols that have occurred at each of the one or more positions of the plurality of data elements;

generate a positional map describing a syntactic structure of the data element by mapping at least one of the one or more alphabets to each position of the data element in a memory of at least one of the one or more memories; and generate one or more special conditions, wherein each special condition in the one or more special conditions maps one or more affected positions in the data element to a conditional subset of at least one alphabet mapped to the one or more affected positions.

9. The apparatus of claim 8, wherein at least one of the one or more memories has further instructions stored thereon to determine the plurality of data elements that, when executed by at least one of the one or more processors, cause at least one of the one or more processors to:

receive a set of data elements, the set of data elements having a plurality of different data element lengths, wherein data element length is a measure of the number of element member positions;

divide the set of data elements into a plurality of groups of data elements based on the data element length of each data element in the set of data elements; and select a group of data elements in the plurality of groups of data elements which has a data element length equal to a data element length of the data element as the plurality of data elements.

10. The apparatus of claim 8, wherein the one or more special conditions are generated based at least in part on one or more trends in the scanned symbols occurring at a plurality of positions.

11. The apparatus of claim 8, wherein the data masking syntactic definition comprises the one or more alphabets, the positional map, and the one or more one or more special conditions, and wherein at least one of the one or more memories has further instructions stored thereon that, when executed by at least one of the one or more processors, cause at least one of the one or more processors to:

generate a masked data element using the data masking syntactic definition.

12. The apparatus of claim 8, wherein each alphabet comprises a set of one or more sequential symbols.

13. The apparatus of claim 8, wherein the instructions that, when executed by at least one of the one or more processors, cause at least one of the one or more processors to generate one or more alphabets based at least in part on scanning symbols occurring at a plurality of positions of a plurality of data elements of the unknown type further cause at least one of the one or more processors to:

generate a plurality of dictionaries based at least in part on symbols occurring in the plurality of data elements at each of the plurality of positions, wherein each dictionary in the plurality of dictionaries includes symbols occurring at a corresponding position in the plurality of positions;

generate a plurality of potential alphabets by, for each dictionary in the plurality of dictionaries, generating one or more sets of sequential symbols such that the union of the one or more sets of sequential element members includes each symbol in that dictionary, the one or more sets of sequential symbols corresponding to one or more potential alphabets in the plurality of potential alphabets; and merge the plurality of potential alphabets into the one or more alphabets.

14. The apparatus of claim 13, wherein the instructions that, when executed by at least one of the one or more processors, cause at least one of the one or more processors to merge the plurality of potential alphabets into the one or more alphabets further cause at least one of the one or more processors to:

remove any redundant potential alphabets in the plurality of potential alphabets; or apply an outlier detection test to the plurality of potential alphabets to remove any potential alphabets which are outliers relative to the plurality of potential alphabets.

15. At least one non-transitory computer-readable medium storing computer-readable instructions for generating a data masking syntactic definition for a data element of an unknown type that, when executed by one or more computing devices, cause at least one of the one or more computing devices to:

generate one or more alphabets based at least in part on scanning symbols occurring at a plurality of positions of a plurality of data elements of the unknown type, wherein each alphabet corresponds to one or more positions of the data element and comprises a set of one or more symbols that have occurred at each of the one or more positions of the plurality of data elements;

generate a positional map describing a syntactic structure of the data element by mapping at least one of the one or more alphabets to each position of the data element in a memory of at least one of the one or more memories; and generate one or more special conditions, wherein each special condition in the one or more special conditions maps one or more affected positions in the data element to a conditional subset of at least one alphabet mapped to the one or more affected positions.

16. The at least one non-transitory computer-readable medium of claim 15, wherein at least one of the one or more memories has further instructions stored thereon to determine the plurality of data elements that, when executed by at least one of the one or more computing devices, cause at least one of the one or more computing devices to:

receive a set of data elements, the set of data elements having a plurality of different data element lengths, wherein data element length is a measure of the number of element member positions;

divide the set of data elements into a plurality of groups of data elements based on the data element length of each data element in the set of data elements; and select a group of data elements in the plurality of groups of data elements which has a data element length equal to a data element length of the data element as the plurality of data elements.

17. The at least one non-transitory computer-readable medium of claim 16, wherein the one or more special conditions are generated based at least in part on one or more trends in the scanned symbols occurring at a plurality of positions.

18. The at least one non-transitory computer-readable medium of claim 15, wherein the data masking syntactic definition comprises the one or more alphabets, the positional map, and the one or more one or more special conditions, and wherein at least one of the one or more memories has further instructions stored thereon that, when executed by at least one of the one or more computing devices, cause at least one of the one or more computing devices to:

generate a masked data element using the data masking syntactic definition.

19. The at least one non-transitory computer-readable medium of claim 15, wherein each alphabet comprises a set of one or more sequential symbols.

20. The at least one non-transitory computer-readable medium of claim 15, wherein the instructions that, when executed by at least one of the one or more computing devices, cause at least one of the one or more computing devices to generate one or more alphabets based at least in part on scanning symbols occurring at a plurality of positions of a plurality of data elements of the unknown type further cause at least one of the one or more computing devices to:

generate a plurality of dictionaries based at least in part on symbols occurring in the plurality of data elements at each of the plurality of positions, wherein each dictionary in the plurality of dictionaries includes symbols occurring at a corresponding position in the plurality of positions;

generate a plurality of potential alphabets by, for each dictionary in the plurality of dictionaries, generating one or more sets of sequential symbols such that the union of the one or more sets of sequential element members includes each symbol in that dictionary, the one or more sets of sequential symbols corresponding to one or more potential alphabets in the plurality of potential alphabets; and merge the plurality of potential alphabets into the one or more alphabets.

21. The at least one non-transitory computer-readable medium of claim 20, wherein the instructions that, when executed by at least one of the one or more computing devices, cause at least one of the one or more computing devices to merge the plurality of potential alphabets into the one or more alphabets further cause at least one of the one or more computing devices to:

remove any redundant potential alphabets in the plurality of potential alphabets; or apply an outlier detection test to the plurality of potential alphabets to remove any potential alphabets which are outliers relative to the plurality of potential alphabets.

\* \* \* \* \*